(12) United States Patent
Nakajima et al.

(10) Patent No.: US 8,377,604 B2
(45) Date of Patent: Feb. 19, 2013

(54) FUEL CELL STACK STRUCTURE WITH TIE ROD INCLUDING INNER SHAFT AND OUTER CYLINDER FASTENED TOGETHER WITH JOINING MATERIAL AND MANUFACTURING METHOD

(75) Inventors: Yasushi Nakajima, Kawasaki (JP); Tatsuya Yaguchi, Yokosuka (JP); Hiroki Sakamoto, Yokohama (JP); Yu Owada, Hayama-machi (JP); Hiroshi Sakurai, Chigasaki (JP); Yoshiteru Yasuda, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 13/547,803

(22) Filed: Jul. 12, 2012

(65) Prior Publication Data

US 2012/0282538 A1 Nov. 8, 2012

Related U.S. Application Data

(62) Division of application No. 11/689,033, filed on Mar. 21, 2007, now abandoned.

(30) Foreign Application Priority Data

Mar. 30, 2006 (JP) ................. 2006-093522

(51) Int. Cl.
*H01M 2/08* (2006.01)
*H01M 2/14* (2006.01)
*H01M 2/20* (2006.01)
*H01M 8/24* (2006.01)

(52) U.S. Cl. ........ 429/470; 429/452; 429/467; 429/507; 429/511

(58) Field of Classification Search ............... 429/442, 429/465, 510, 511, 535, 452, 467, 470, 507
See application file for complete search history.

(56) References Cited

U.S. PATENT DOCUMENTS

| 4,430,390 A | 2/1984 | Fekete |
| 6,190,793 B1 | 2/2001 | Barton et al. |
| 6,344,290 B1 | 2/2002 | Bossel |

(Continued)

FOREIGN PATENT DOCUMENTS

| JP | 59-78468 | 5/1984 |
| JP | 60-162366 U | 10/1985 |

(Continued)

OTHER PUBLICATIONS

Nishihara, Y., Human translation of JP 2000-123857 A, Apr. 2000.*

(Continued)

*Primary Examiner* — Basia Ridley
*Assistant Examiner* — Sean P Cullen
(74) *Attorney, Agent, or Firm* — Global IP Counselors, LLP

(57) ABSTRACT

A fuel cell stack structure is basically provided with a stack entity and at least one tie rod. The stack entity includes a plurality of solid electrolyte fuel cell units stacked together in a stacking direction. The tie rod extends through the stack entity to fasten the solid electrolyte fuel cell units so that the solid electrolyte fuel cell units are pressed against each other in the stacking direction. The tie rod has an outer cylinder, an inner shaft fitting into the outer cylinder, and a joining material disposed between the outer cylinder and the inner shaft. The joining material fastens the outer cylinder and the inner shaft together in an axial direction of the tie rod and is configured and arranged to maintain a cured state at an operating temperature.

18 Claims, 14 Drawing Sheets

U.S. PATENT DOCUMENTS

| | | |
|---|---|---|
| 7,037,618 B2 | 5/2006 | Andrews et al. |
| 2002/0142204 A1 | 10/2002 | Prediger et al. |
| 2006/0093890 A1 | 5/2006 | Steinbroner |
| 2007/0281190 A1 | 12/2007 | Stelter |

FOREIGN PATENT DOCUMENTS

| | | |
|---|---|---|
| JP | 61-148770 | 7/1986 |
| JP | 03-119087 | 5/1991 |
| JP | 2000-123857 | 4/2000 |
| JP | 2001-057226 | 2/2001 |
| JP | 2001-155760 | 6/2001 |
| JP | 2004-362995 | 12/2004 |
| JP | 2005-294102 | 10/2005 |
| JP | 2005-353421 | 12/2005 |
| JP | 2005-353461 | 12/2005 |
| JP | 2006-049221 | 2/2006 |
| WO | WO-02/078111 | 10/2002 |
| WO | WO-2005013404 | 2/2005 |

OTHER PUBLICATIONS

The partial European Search Report for corresponding European Application No. 07105099.1-1227/1841000, dated Dec. 9, 2008.

An English translation of the Japanese Office Action of corresponding Japanese Application No. JP 2006-093522, dated Jan. 19, 2012, mailed Jan. 23, 2012.

* cited by examiner

FUEL CELL STACK STRUCTURE WITH TIE ROD INCLUDING INNER SHAFT AND OUTER CYLINDER FASTENED TOGETHER WITH JOINING MATERIAL AND MANUFACTURING METHOD

CROSS-REFERENCE TO RELATED APPLICATIONS

This application is a divisional of U.S. patent application Ser. No. 11/689,033, filed on Mar. 21, 2007. This application claims priority to Japanese Patent Application No. 2006-093522, filed on Mar. 30, 2006. The entire disclosure of Japanese Patent Application No. 2006-093522 is hereby incorporated herein by reference.

BACKGROUND

1. Field of the Invention

The present invention relates to a fuel cell stack structure having a stack entity including a plurality of solid electrolyte fuel cells stacked together.

2. Background Information

A conventional fuel cell stack structure includes, for example, a stack entity having a plurality of solid electrolyte fuel cell units and a tie rod that passes through the stack entity to secure and apply pressure to the solid electrolyte fuel cell units. The solid electrolyte fuel cell units are stacked together with a sealing material having a gas sealing capability being disposed between the solid electrolyte fuel cell units.

U.S. Pat. No. 6,344,290 discloses an example of such conventional fuel cell stack structures. With the conventional fuel cell stack structure, it is necessary to tighten the tie rod inside a high-temperature furnace and to absorb the decrease in the thickness of the sealing material in order to maintain the pressure applied by the tie rod. In the conventional fuel cell stack structure disclosed in the above mentioned reference, the tie rod is arranged to be long such that the tie rod tightening task can be accomplished remotely, i.e., the pressure applying force of the tie rod can be controlled remotely.

In view of the above, it will be apparent to those skilled in the art from this disclosure that there exists a need for an improved fuel cell stack structure and fuel cell stack structure manufacturing method. This invention addresses this need in the art as well as other needs, which will become apparent to those skilled in the art from this disclosure.

SUMMARY

In the conventional fuel cell stack structure disclosed in the above mentioned reference, the tie rod is long so that the task of tightening the tie rod can be performed outside of the high-temperature furnace. However, since the tie rod is long, it becomes a main impediment to constructing a fuel cell stack structure having a high output density. There has been a need for some time to resolve this problem of the tie rod impeding the achievement of a high output density.

The present invention was conceived in view of this need. One object of the present invention is to provide a fuel cell stack structure that has an improved output density and is configured and arranged such that the solid electrolyte fuel cell units can be fastened together as they are pressurized in the stacking direction and the pressurized state can be maintained for a long period of time. It is also an object of the present invention to provide a manufacturing method for manufacturing a fuel cell stack structure that has an improved output density.

In order to achieve the above mentioned objects and other objects of the present invention, a fuel cell stack structure is provided that basically comprises a stack entity and at least one tie rod. The stack entity includes a plurality of solid electrolyte fuel cell units stacked together in a stacking direction. The tie rod extends through the stack entity to fasten the solid electrolyte fuel cell units so that the solid electrolyte fuel cell units are pressed against each other in the stacking direction. The tie rod has an outer cylinder, an inner shaft fitting into the outer cylinder, and a joining material disposed between the outer cylinder and the inner shaft. The joining material fastens the outer cylinder and the inner shaft together in an axial direction of the tie rod and is configured and arranged to maintain a cured state at an operating temperature.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
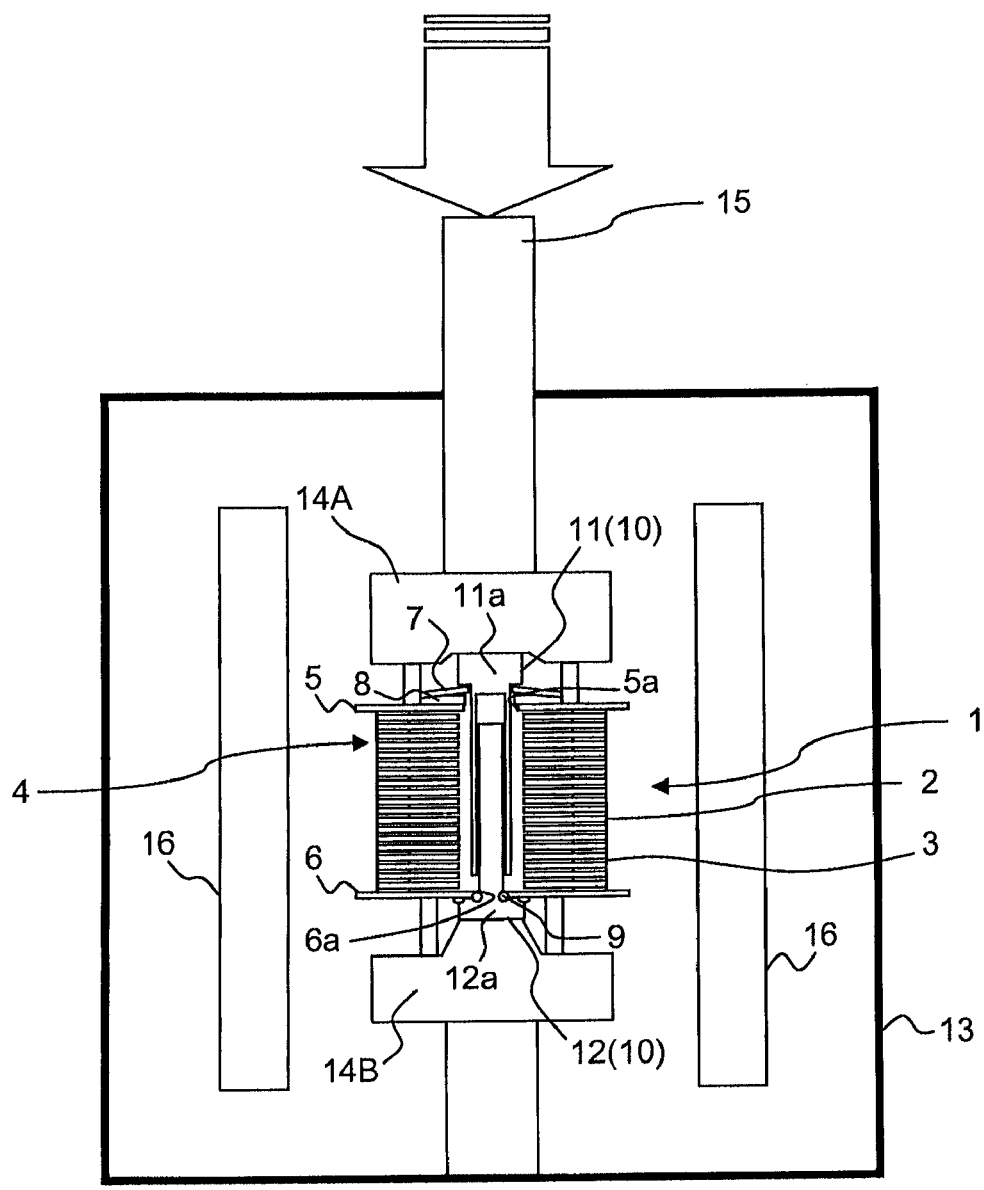
FIG. 1 is a simplified vertical cross sectional view illustrating a fuel cell stack structure being fabricated in a pressure welding furnace in accordance with a first embodiment of the present invention.

Referring initially to FIG. 1, a fuel cell stack structure 1 is illustrated in accordance with the first embodiment of the present invention. FIG. 1 is a simplified vertical cross sectional view illustrating the fuel cell stack structure 1 being fabricated in a pressure welding furnace 13 in accordance with the first embodiment. As shown in FIG. 1, the fuel cell stack structure 1 includes a stack entity 4, a pair of end plates 5 and 6, a Belleville spring 7, and a tie rod 10. The stack entity 4 has a plurality of solid electrolyte fuel cell units 2 stacked together with a sealing material 3 disposed between the solid electrolyte fuel cell units 2. The solid electrolyte fuel cell unit 2 is a conventional component that is well known in the art. Since the solid electrolyte fuel cell unit 2 is well known in the art, the structures will not be discussed or illustrated in detail herein. Rather, it will be apparent to those skilled in the art from this disclosure that the component can be any type of structure that can be used to carry out the present invention. The end plates 5 and 6 are arranged on the upper and lower ends of the stack entity 4, respectively. The Belleville spring 7 is arranged on the upper surface of the upper end plate 5. The tie rod 10 is arranged to pass through the upper end plate 5, the stack entity 4, and the lower end plate 6 as shown in FIG. 1. In addition, an insulating plate 8 is preferably arranged between the upper end plate 5 and the Belleville spring 7, which is configured and arranged to electrically insulate the two ends of the tie rod 10 from each other and prevents electrical short circuiting between the top and bottom portions of the stack entity 4.

As shown in FIG. 1, the tie rod 10 has an outer cylinder 11 and an inner shaft 12 that fits into the outer cylinder 11. The end plates 5 and 6 have rod through holes 5*a* and 6*a*, respectively, and the base end portions of the outer cylinder 11 and the inner shaft 12 have head portions 11*a* and 12*a*, respectively. A diameter of each of the head portions 11*a* and 12*a* is larger than diameters of the rod through holes 5*a* and 6*a*. A sealing material 9 that is the same material as the sealing material 3 is preferably disposed in an airtight manner between the inner shaft 12 of the tie rod 10 and the rod through hole 6*a* of the lower end plate 6. The Bellville spring 7 is disposed between the head portion 11*a* of the outer cylinder 11 and the upper surface of the upper end plate 5. The outer cylinder 11 and the inner shaft 12 are fastened together in the lengthwise direction (i.e., the relative movement between the outer cylinder 11 and the inner shaft 12 in the axial direction of the tie rod 10 is restricted) by using a plurality of claw-shaped parts 11*b* and 12*b* (fixing member) to oppose the spring force of the Belleville spring 7. As a result, a uniform pressure is applied to the stack entity 4 by the end plates 5 and 6.

Figure 2B:
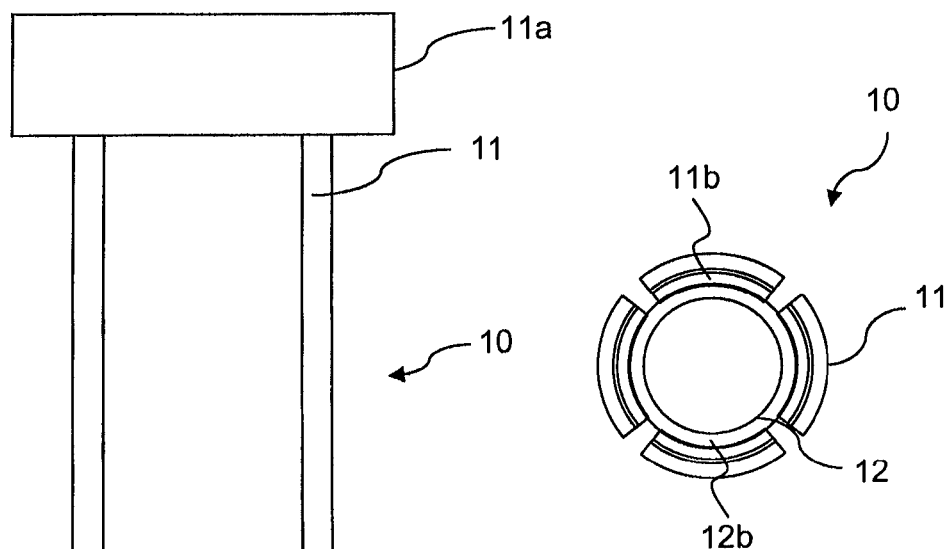
FIG. 2(b) is a simplified horizontal cross sectional view of the tie rod taken along a section line 2(b)-2(b) of FIG. 2(a) in accordance with the first embodiment of the present invention.
Figure 2A:
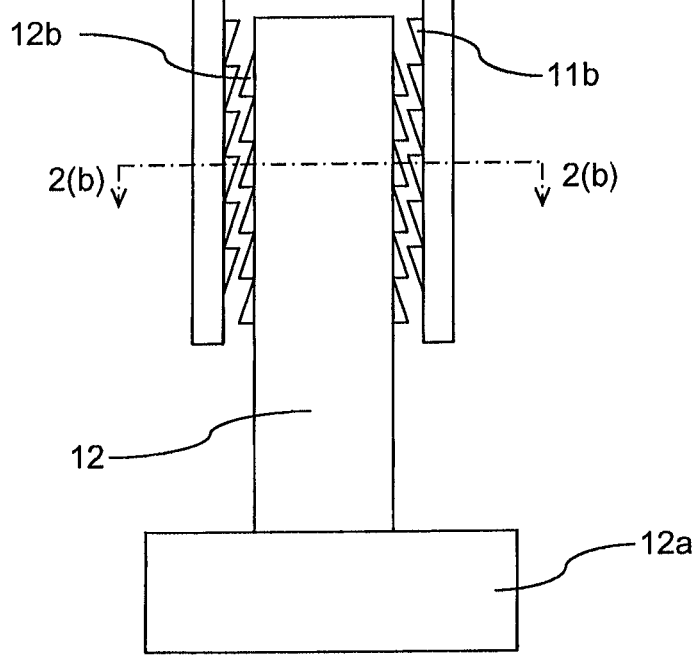
FIG. 2(a) is an enlarged simplified vertical cross sectional view of a tie rod of the fuel cell stack structure illustrated in FIG. 1 in accordance with the first embodiment of the present invention.

FIG. 2(*a*) is an enlarged simplified vertical cross sectional view of the tie rod 10 of the fuel cell stack structure 1 illustrated in FIG. 1. FIG. 2(*b*) is a simplified horizontal cross sectional view of the tie rod 10 taken along a section line 2(*b*)-2(*b*) of FIG. 2(*a*). As shown in FIG. 2, the fixing member in the first embodiment includes the cylinder claw-shaped parts 11*b* and the shaft claw-shaped parts 12*b* that are provided on the opposing surfaces of the outer cylinder 11 and the inner shaft 12, respectively. The cylinder claw-shaped parts 11*b* and the shaft claw-shaped parts 12*b* constitute a so-called ratchet mechanism. More specifically, the claw-shaped parts 11*b* and 12*b* are configured and arranged to engage with one another such that sliding movement of the inner shaft 12 in the direction of entering into the outer cylinder 11 (upward direction in FIG. 2(*a*)) is permitted and sliding movement of the inner shaft 12 in the direction of removal from the outer cylinder 11 (downward direction in FIG. 2(*a*)) is restricted. Thus, the outer cylinder 11 and the inner shaft 12 of the tie rod 10 can be fixed in the lengthwise direction (i.e., the relative movement between the outer cylinder 11 and the inner shaft 12 in the axial direction of the tie rod 10 is restricted) without using a screw connection.

Assuming the operating temperature of the fuel cell stack structure 1 is 600 C°, a material that maintains a high strength at the high temperature such as Inconel 750® can be used as the material for the tie rod 10. Additionally, a glass material having a high viscosity at 600 C°, a hardened ceramic-based adhesive, or a ceramic glass that crystallizes at approximately 600 C.° can be used as the sealing material 3 that is arranged between the solid electrolytic fuel cell units 2 of the stack entity 4.

In the first embodiment, a glass containing a non-alkaline element and having a softening point of 650 C.° is preferably used as the sealing material 3 between the fuel cell units 2 of the stack entity 4. The solid electrolytic fuel cell units 2 are preferably made of ferritic stainless steel, and each of the solid electrolytic fuel cell units 2 has a thickness of 2 mm. The thickness of the sealing material 3 is 0.2 mm initially and 0.1 mm after the tie rod 10 has been installed and the outer cylinder 11 and inner shaft 12 are joined together. In the first embodiment, the stack entity 4 preferably includes 100 layers of the solid electrolytic fuel cell units 2 and the sealing material 3 disposed between the solid electrolytic fuel cell units 2. The thickness of each of the end plates 5 and 6 is preferably 5 mm and the thickness of each of the Bellville spring 7 and the insulation plate 8 is preferably 4 mm. Accordingly, a required length of each of the outer cylinder 11 and the inner shaft 12 of the tie rod 10 is 14.2 cm with an initial overlapping length between the outer cylinder 11 and the inner shaft 12 being 5 cm.

The outer cylinder 11 of the tie rod 10 is split in the lengthwise direction and has a wall thickness of 2 mm and an external diameter of 12 mm. On the other hand, the external diameter of the inner shaft 12 is 8 mm. Each of the head portions 11a and 12a of the outer cylinder 11 and the inner shaft 12, respectively, has an external diameter of 16 mm and a height of 10 mm. The pitch of the claw-shaped parts 11b and 12b forming the ratchet mechanism is 1 mm and the tooth height of the claw-shaped parts is 0.5 mm. The claw-shaped parts 11b and 12b are provided over the entire region of the opposing surfaces of the outer cylinder 11 and the inner shaft 12 (an inner circumferential surface of the outer cylinder 11 and an outer circumferential surface of the inner shaft 12) where the outer cylinder 11 and the inner shaft 12 overlap in order to enable stresses to be dispersed. The claw-shaped parts 11b and 12b are preferably formed by machining.

As mentioned above, the sealing material 9 that is the same material as the sealing material 3 is preferably disposed in an airtight manner between the inner shaft 12 of the tie rod 10 and the rod through hole 6a of the lower end plate 6. The sealing material 9 is arranged as a gas seal in the gap between the tie rod 10 and the rod through hole 6a of the end plate 6. As mentioned above, the insulating plate 8 arranged between the upper end plate 5 and the Belleville spring 7 is configured and arranged to electrically insulate the two ends of the tie rod 10 from each other and prevents electrical short circuiting between the top and bottom portions of the stack entity 4.

In order to manufacture the fuel cell stack structure 1, the stack entity 4 is sandwiched between a pair of jigs 14A and 14B inside the pressure welding furnace 13 as shown in FIG. 1. Then, the furnace 13 is heated with a plurality of heaters 16 to 650 C.° (the sealing temperature of the sealing material 3) while applying an axial compressive pressure to the stack entity 4 in the stacking direction with a push rod 15 as shown in FIG. 1.

The height of the stack entity 4 decreases during the heating and pressurizing. The stack entity 4 is then cooled at this decreased height state until the height of the sealing material 3 stabilizes. Next, while continuing to cool the stack entity 4, the tie rod 10 is compressed to the same decreased height of the stack entity 4, and thus, the tie rod 10 also compresses the Belleville spring 7. The cooling is stopped when the cylinder claw-shaped parts 11b and the shaft claw-shaped parts 12b have engaged with each other to such an extent that the fastening force can be maintained.

The process of fixing the stack entity 4 with the tie rod 10 having the ratchet mechanism including the cylinder claw-shaped parts 11b and the shaft claw-shaped parts 12b is simple as described above. In the first embedment, the stroke of the Belleville spring 7 is set to be a relatively large value (e.g., 1.5 mm) because the locking action is accomplished in a step-like manner by the claw-shaped parts 11b and 12b. Alternatively, in order to ensure sufficient strength at high temperatures with smaller steps, i.e., smaller claw-shaped parts, the number of claw-shaped parts should be increased and the tie rod 10 or at least the claw-shaped parts should be made of a material that maintains a high strength at the high temperature mentioned above, e.g., a nickel-based superalloy.

When the tie rod 10 is made of a nickel-based superalloy, the tie rod 10 will contract more during cooling than a tie rod made of ferritic stainless steel because the thermal coefficient of expansion of a nickel-based superalloy is approximately 5 ppm larger than that of ferritic stainless steel. Consequently, it is not necessary to completely flatten the Belleville spring 7 when joining the outer cylinder 11 and the inner shaft 12 together because the tie rod 10 will act to clamp down on the stack entity 4 when the tie rod 10 cools after the joining process.

Figure 3:
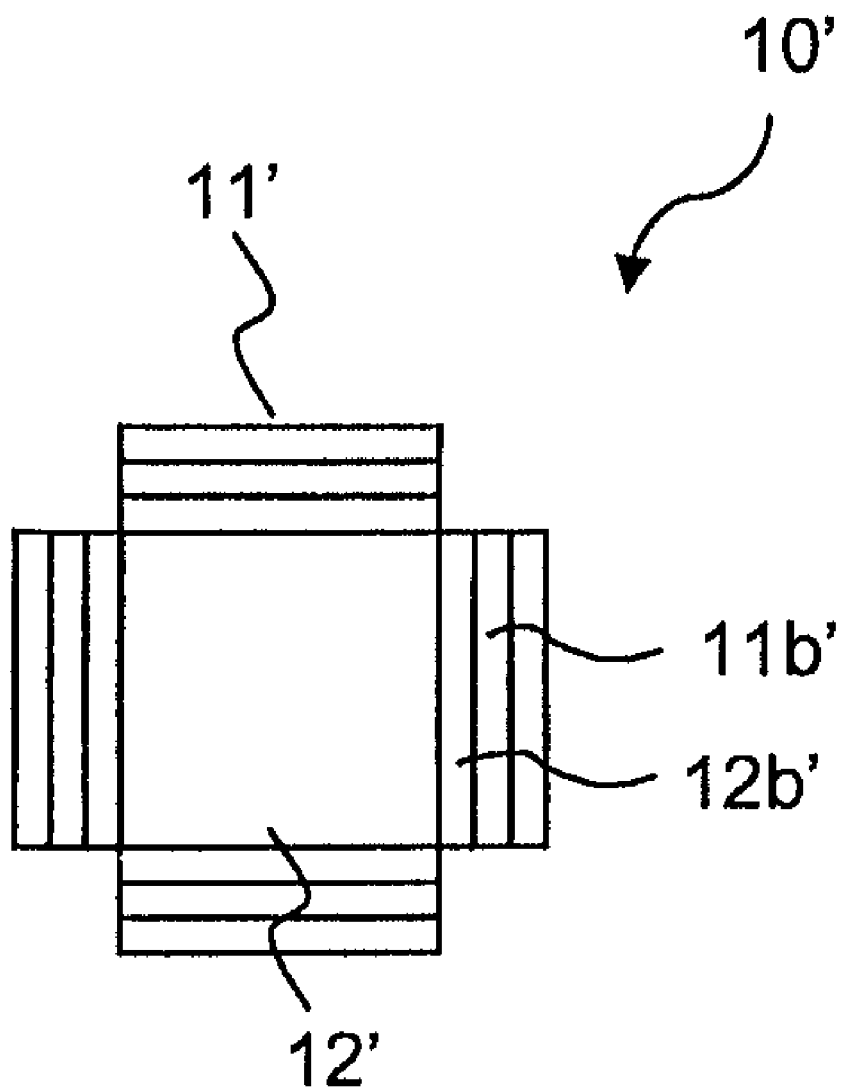
FIG. 3 is a simplified horizontal cross sectional view of an alternative configuration of the tie rod of the fuel cell stack structure illustrated in FIGS. 1 and 2(a), which corresponds to the cross sectional view taken along the section line 2(b)-2(b) of FIG. 2(a) in accordance with the first embodiment of the present invention.

In the fuel cell stack structure 1 of the first embodiment, the tie rod 10 preferably has a circular cross sectional shape as shown in FIG. 2(b). Moreover, the outer cylinder 11 preferably has a plurality of lengthwise splits that functions as springs serving to cause the claw-shaped parts 11b and the claw-shaped parts 12b of the ratchet mechanism to engage with each other. However, as shown in FIG. 3, it is also feasible for a tie rod 10' including inner shaft 12' to have a square cross sectional shape and for an outer cylinder 11' to have a plate-like form (e.g., four plates forming a generally rectangular cross section with a plurality of lengthwise splits disposed in the corner portions) that serves as springs for causing a plurality of claw-shaped parts 11b' and 12b' to engage with each other.

Figure 4A:
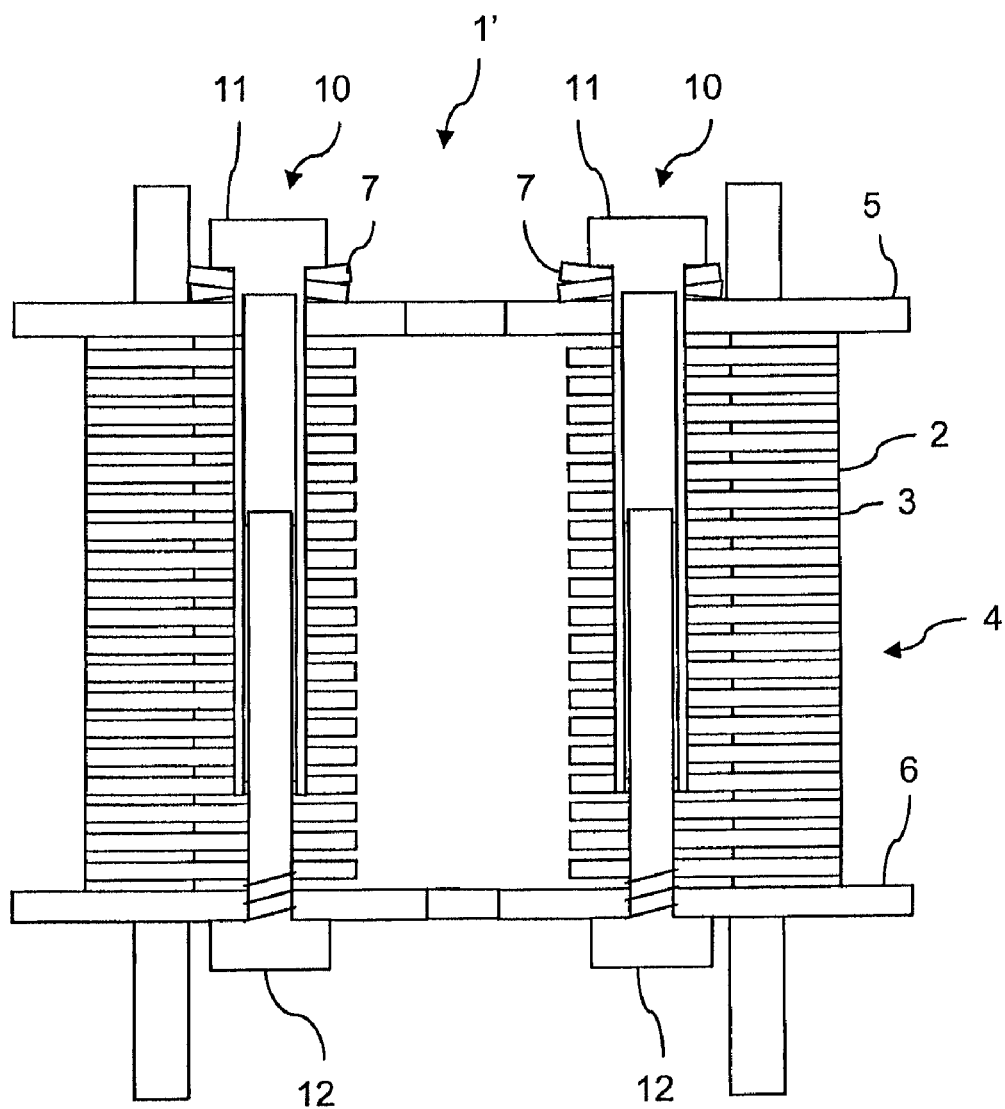
FIG. 4(a) is a simplified vertical cross sectional view of an alternative configuration of the fuel cell stack structure in accordance with the first embodiment of the present invention.
Figure 4B:
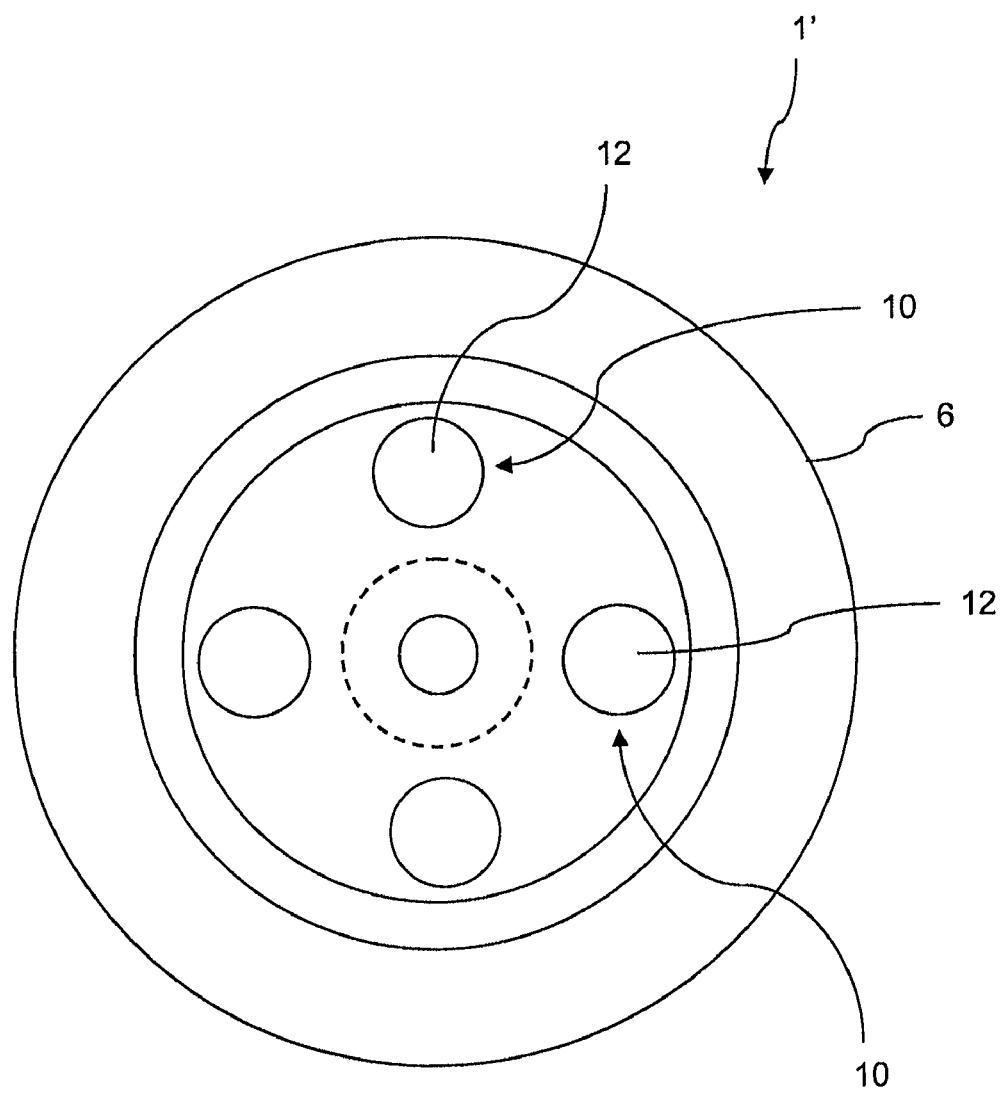
FIG. 4(b) is a bottom plan view of the alternative configuration of the fuel cell stack structure illustrated in FIG. 4(a) in accordance with the first embodiment of the present invention.

It is also acceptable to modify the fuel cell stack structure 1 of the first embodiment such that the tie rods 10 are provided in a modified fuel cell stack structure 1' as shown in FIGS. 4(a) and 4(b). When the tie rods 10 are used, it is preferable for the jigs used to press the tie rods 10 to be parallel to each other. If the jigs are parallel, then the tie rods 10 will automatically be held in a parallel state between the end plates 5 and 6.

Accordingly, the fuel cell stack structure 1 in accordance with the first embodiment includes the stack entity 4 having the solid electrolyte fuel cell units 2 stacked together in a stacking direction, and the tie rod 10 that passes through the stack entity 4 and serves to fasten the solid electrolyte fuel cell units 2 such that they are pressurized against one another in the stacking direction. The tie rod 10 has the outer cylinder 11, the inner shaft 12 that fits into the outer cylinder 11, and the fixing member (the claw-shaped parts 11b and 12b) configured and arranged to fix the outer cylinder 11 and the inner shaft 12 together in the lengthwise direction.

With the fuel cell stack structure 1 in accordance with the first embodiment, when the inner shaft 12 and the outer cylinder 11 of the tie rod 10 are fitted together during assembly, the outer cylinder 11 and the inner shaft 12 become fixed together in the lengthwise direction by the fixing member. Consequently, the solid electrolyte fuel cell units 2 can be pressurized in the stacking direction without tightening and retightening the tie rod 10 in the conventional manner and the pressurized state can be maintained. Consequently, the tie rod 10 does not need to be long and the output density can be improved.

With the fuel cell stack structure 1 in accordance with the first embodiment, the output density of the assembled fuel cell stack structure 1 is improved and the task of fastening the solid electrolytic fuel cell units 2 together such that they are pressurized in the stacking direction can be accomplished more simply. Additionally, since the pressurizing force is adjusted automatically in the joining step, the highly advantageous effect of eliminating variance of the joint quality of the stack entity 4 can be obtained.

The fuel cell stack structure 1' in accordance with the first embodiment can be configured to have a plurality of tie rods 10 as shown in FIGS. 4(a) and 4(b). When the tie rods 10 are used in order to distribute the pressurizing force, the fuel cell stack structure 1' makes it possible to fasten the outer cylinder 11 and the inner shaft 12 of each of the tie rods 10 in a uniform manner.

The fuel cell stack structure 1 in accordance with the first embodiment can be configured and arranged to have the end plates 5 and 6 on both ends thereof that have larger mechanical strengths than the solid electrolytic fuel cell units 2. The end plates 5 and 6 include the rod through holes 5a and 6a, respectively, for passing the tie rod 10 there-through. Additionally, the gas sealing material 9 can be filled in an airtight manner between the tie rod 10 and the rod through holes 5a and 6a of the end plates 5 and 6, respectively.

When this configuration is adopted, gas leakage between the stack entity 4 and the tie rod 10 can be prevented and, when a joining material (the sealing material 3) having a gas sealing capability is disposed between the solid electrolyte fuel cell units 2, the sealing performance can be secured simultaneously with the heating of the joining material after the solid electrolyte fuel cell units 2 have been stacked, i.e., the sealing performance can be secured without increasing the number of steps. In order to increase the gas sealing performance between the rod through holes 5a and 6a and the tie rod 10 while also exerting a reliable pressurizing force against the stack entity 4, it is preferable to provide the heads portions 11a and 12a having larger diameters than the openings of the rod through holes 5a and 6a on the base end portions of the outer cylinder 11 and the inner shaft 12 of the tie rod 10, i.e., the end portions that are opposite the end portions that fit together.

The fuel cell stack structure 1 in accordance with the first embodiment is configured and arranged such that the fixing member includes the claw-shaped parts 11b and 12b (a so-called "ratchet mechanism") provided on the opposing surfaces of the outer cylinder 11 and the inner shaft 12 of the tie rod 10. The claw-shaped parts 11b and 12b are configured and arranged such that the claw-shaped parts 11b of the outer cylinder 11 and the claw-shaped parts 12b of the inner shaft 12 can engage with one another such that sliding movement of the inner shaft 12 in the direction of entering into the outer cylinder 11 is permitted and sliding movement of the inner shaft 12 in the direction of removal from the outer cylinder 11 is restricted. When this configuration is adopted, the outer cylinder 11 and the inner shaft 12 can be fixed together by simply pushing one into the other and heating is not necessary. As a result, the assembly operation of the fuel cell stack structure 1 of the first embodiment can be made extremely simple.

The tie rod 10 of the fuel cell stack structure in accordance with the first embodiment can be configured and arranged such that the portion of the inner shaft 12 of the tie rod 10 that fits into the outer cylinder 11 has a tapered shape. When this configuration is adopted, the gap between the outer cylinder 11 and the inner shaft 12 of the tie rod 40 becomes gradually smaller as the inner shaft 12 is pushed into the outer cylinder 11. As a result, the latching action of the claw-shaped parts 11b and 12b can be made to become gradually stronger in a step-like fashion when a ratchet mechanism is employed. More specifically, when the fixing member is the ratchet mechanism (the claw-shaped parts 11b and 12b), the claw-shaped parts 11b and 12b latch onto one another more strongly as the inner shaft 12 is pushed farther into the outer cylinder 11 and the inner shaft 12 and outer cylinder 11 are fixed together securely without any play.

The manufacturing method for the fuel cell stack structure 1 in accordance with the first embodiment includes the steps of forming the stack entity 4 by stacking a plurality of the solid electrolyte fuel cell units 2 in the stacking direction, inserting the tip end portion of the outer cylinder 11 of the tie rod 10 into the stack entity 4 from a first end of the stack entity 4 and inserting the tip end of the inner shaft 12 of the tie rod 10 into the stack entity from a second end of the stack entity 4, fitting the outer cylinder 11 and the inner shaft 12 of the tie rod 10 together, and fixing the outer cylinder 11 and the inner shaft 12 of the tie rod 10 together in the lengthwise direction by causing the claw-shaped parts 11b of the outer cylinder 11 and the claw-shaped parts 12b of the inner shaft 12 to become engaged while applying axial compressive pressure to the tie rod 10.

Second Embodiment

Referring now to FIGS. 5 to 8, a fuel cell stack structure 1" in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 5:
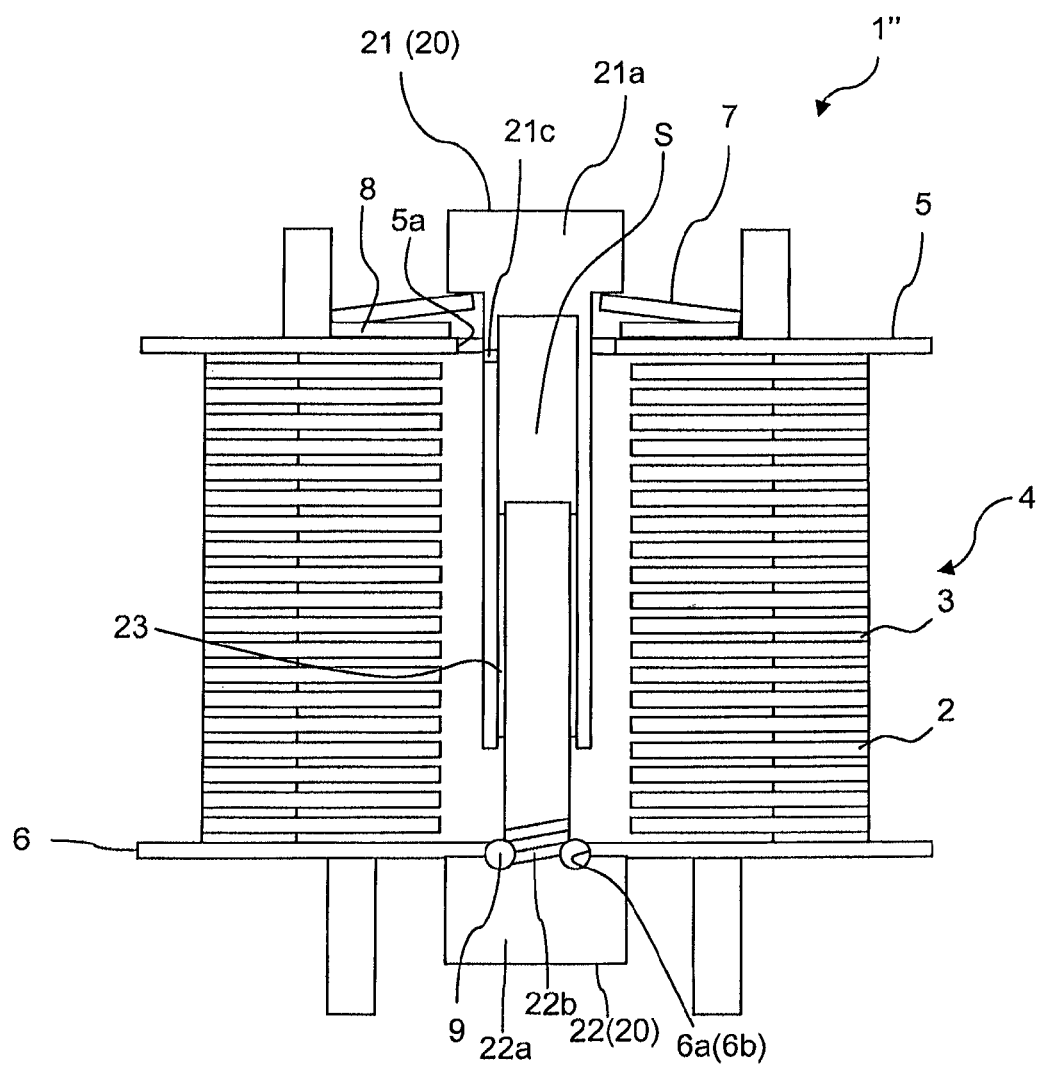
FIG. 5 is a simplified vertical cross sectional view of a fuel cell stack structure in accordance with a second embodiment of the present invention.

FIG. 5 is a simplified vertical cross sectional view of the fuel cell stack structure 1" in accordance with the second embodiment. The fuel cell stack structure 1" of the second embodiment differs from the fuel cell stack structure 1 of the first embodiment in that the fuel cell stack structure 1" of the second embodiment uses a metallic glass material (joining material) 23 as the fixing member configured and arranged to fasten an outer cylinder 21 and an inner shaft 22 of a tie rod 20 together in the lengthwise direction (i.e., the axial direction of the tie rod 20).

Similarly to the first embodiment, the tie rod 20 that passes through the stack entity 4 includes the outer cylinder 21 and the inner shaft 22. The end plates 5 and 6 have the rod through holes 5a and 6a, respectively. Moreover, the base end portions of the outer cylinder 21 and the inner shaft 22 have head portions 21a and 22a, respectively, whose diameters are larger than the diameters of the rod through holes 5a and 6a. An externally threaded section 22b is formed on a portion of the inner shaft 22 near the head portion 22a. The externally threaded section 22b is configured to engage with an internally threaded section 6b formed in the rod through hole 6a of the end plate 6. Moreover, the outer cylinder 21 includes a communication hole (vent hole) 21c provided in the shaft portion of the outer cylinder 21 as shown in FIG. 5.

In the second embodiment too, a glass containing a non-alkaline element and having a softening point of 650 C.° is preferably used as the sealing material 3 disposed between the solid electrolytic fuel cell units 2 of the stack entity 4. Each of the solid electrolytic fuel cell units 2 is preferably made of ferritic stainless steel having a thickness of 2 mm. The thickness of the sealing material 3 is preferably 0.2 mm initially and 0.1 mm after the tie rod 20 has been installed and the outer cylinder 21 and inner shaft 22 joined together. The stack entity 4 preferably includes 100 layers of the solid electrolytic fuel cell units 2 and the sealing materials 3. The thickness of each of the end plates 5 and 6 is preferably 5 mm and the thickness of each of the Bellville spring 7 and the insulation plate 8 is preferably 4 mm. Accordingly, a required length of each of the outer cylinder 21 and the inner shaft 22 of the tie rod 20 is 14.2 cm with an initial overlapping length between the outer cylinder 21 and the inner shaft 22 being 5 cm.

The externally threaded section 22b is preferably arranged as a fine M8 thread provided near the head portion 22a of the inner shaft 22 of the tie rod 20. The head portion 22a has a diameter of 15 mm and the shaft diameter of the portion other than the externally threaded section 22b is 7.5 mm. In the second embodiment, since fine ratchet claw-shaped parts as in the first embodiment are not necessary, an austenitic stainless steel having a high chromium content for corrosion resistance is used as the material for the tie rods 20.

Figure 6:
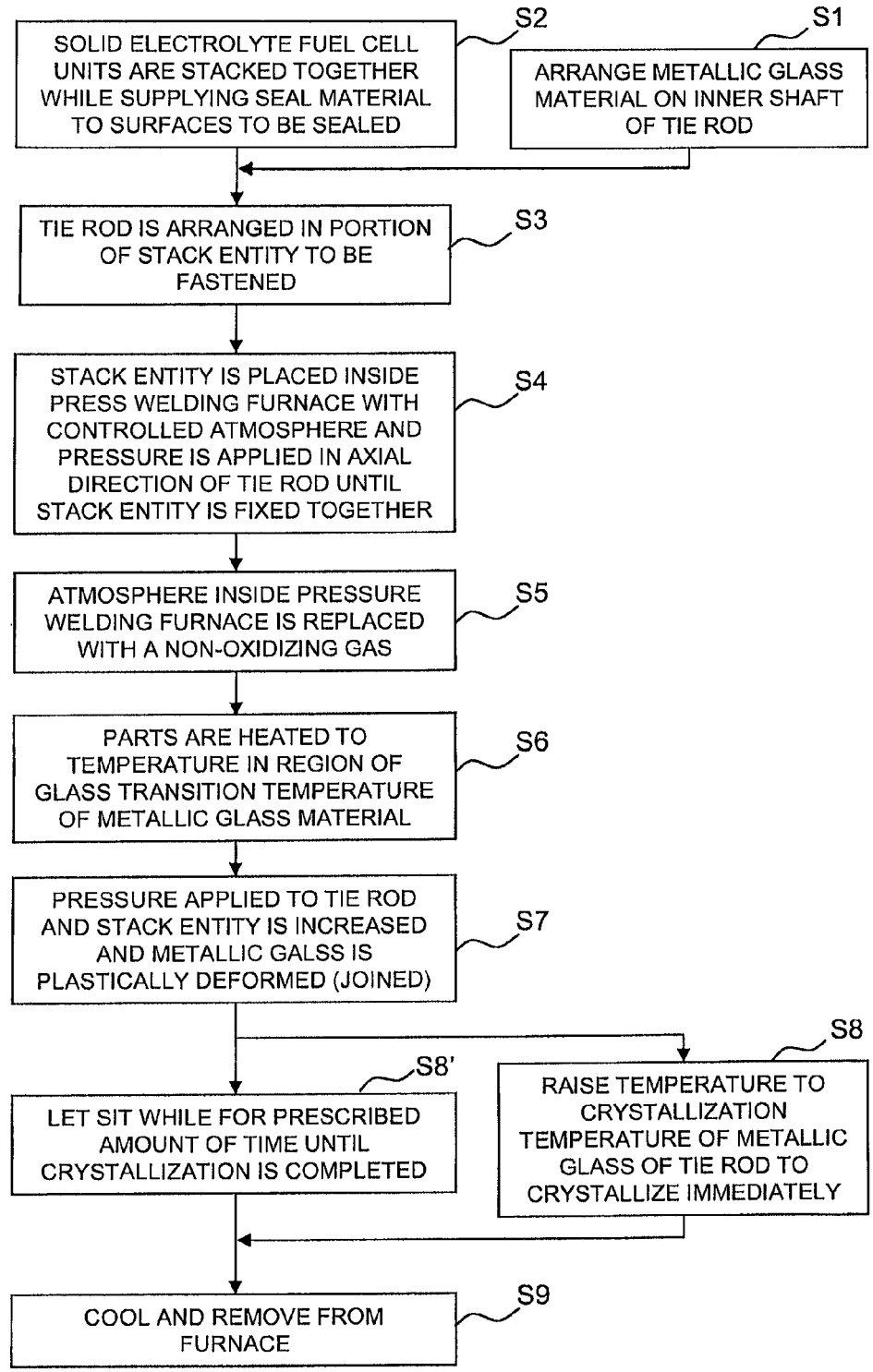
FIG. 6 is a flowchart explaining a process of manufacturing the fuel cell stack structure illustrated in FIG. 5 in accordance with the second embodiment of the present invention.

FIG. 6 is a flowchart explaining a process of manufacturing the fuel cell stack structure 1″ illustrated in FIG. 5 in accordance with the second embodiment of the present invention. In order to manufacture the fuel cell stack structure 1″ of the second embodiment, first the fine externally threaded section 22b of the inner shaft 22 of the tie rod 20 is screwed into the internally threaded section 6b of the through hole 6a of the end plate 6. At the same time, the sealing material 9 that is the same as the interlayer sealing material 3 is filled between the head portion 22a of the inner shaft 22 and the rod through hole 6a of the end plate 6.

The gap between the outer cylinder 21 and the inner shaft 22 of the tie rod 20 is 250 μm. The well known composition Ni52-Nb20-Nr18-Co10 is selected as the metallic glass material 23 (fixing member) in the second embodiment. The metallic glass provided in a thin sheet form of thickness 100 μm is wrapped onto the surface of the inner shaft 22 in two layers spanning a length of 5 cm from the overlapping end (tip end) of the inner shaft 22 (step S1).

After the inner shaft 22 is fastened to the end plate 6 with the sealing material 9 arranged in-between, the solid electrolytic fuel cell units 2 and the sealing material 3 are stacked alternately until the stack entity 4 having 100 layers is achieved (step S2). Next, the upper end plate 5 of the stack entity 4 is placed on top of the stack entity 4 and the insulating plate 8 having a center hole of diameter 12.5 mm and the Belleville spring 7 are placed on top of the upper end plate 5. Then, the outer cylinder 21, which has an external diameter of 12 mm and an internal diameter of 8 mm, is inserted and fitted together with the inner shaft 22, thus completing the preparation of the fuel cell stack structure 1″ (step S3). The external diameter of the head portion 21a of the outer cylinder 21 is 18 mm. As mentioned above, the outer cylinder 21 includes the communication hole 21c provided in the shaft portion of the outer cylinder 21 as shown in FIG. 5.

Next, the assembled fuel cell stack structure 1″ is set on the jigs of the pressing device (the furnace 13 shown in FIG. 1) in the same manner as the first embodiment, and a light vertical pressure is applied to the fuel cell stack structure 1″ (step S4).

The inside of the furnace 13 (FIG. 1) is then evacuated, supplied with argon gas (step S5), and raised to the glass transition point 858 K of the metallic glass 23 (step S6). The vertical pressure applied to the fuel cell stack structure 1″ is increased and the application of the pressure is continued until the thickness of the sealing material 3 is between 0.2 and 0.1 mm, i.e., until the height of the 100 layers decreases by 1 cm (step S7). Based on experience, it has been observed that a glass material, such as the sealing material 3, can collapse at a temperature slightly lower than the nominal softening point.

As the tie rod 20 shortens by 1 cm (due to the inner shaft 22 moving into outer cylinder 21), the metallic glass 23 is softened due to friction the metallic glass 23 undergoes between the outer cylinder 21 and the inner shaft 22 and the oxide films on the surfaces of the metallic glass 23 are broken. When the oxide films break, the exposed fresh surfaces of the metallic glass 23 contact the opposing surfaces of the outer cylinder 21 and the inner shaft 22 and join thereto (step S7).

Next, the temperature is raised to 900 K (which is slightly higher than the crystallization temperature of the metallic glass 23) until the metallic glass 23 is completely crystallized (step S8). Immediately after crystallization of the metallic glass is completed, the furnace 13 (FIG. 1) is cooled and the pressure is released (step S9). With this method, crystallization can be accomplished in a reliable manner without the need for time management because the temperature is raised above the crystallization temperature. After the metallic glass 23 has crystallized, the pressure can be released as appropriate without the joined portions separating.

Alternatively, instead of raising the temperature of the furnace 13 (FIG. 1) in order to crystallize the metallic glass 23 in step S8, it is also possible to continue the heat treatment at a temperature below the crystallization temperature for a prescribed amount of time after the glass transition occurs (step S8′). The prescribed amount of time used in step S8′ is determined based on the temperature used for the heat treatment. With this alternative method, thermal deformation can be reduced and degradation of the electrodes of the fuel cell can be suppressed because the processing temperature is lower.

Moreover, in another alternative method, the outer cylinder 21 and the inner shaft 22 of the tie rod 20 can be fixed together by heating the tie rod 20 alone by passing a large electric current through the tie rod 20 such that the tie rod 20 itself emits heat. With this method, the joining material (the metallic glass 23) can be heated separately from the heating of the fuel cell stack structure 1″ and the time required to raise the joining material to the crystallization temperature can be shortened. As a result, the manufacturing cost can be reduced.

The composition of the metallic glass 23 is not limited to the composition previously stated. There are many other well known compositions that can be used to carry out the present invention.

Figure 7:
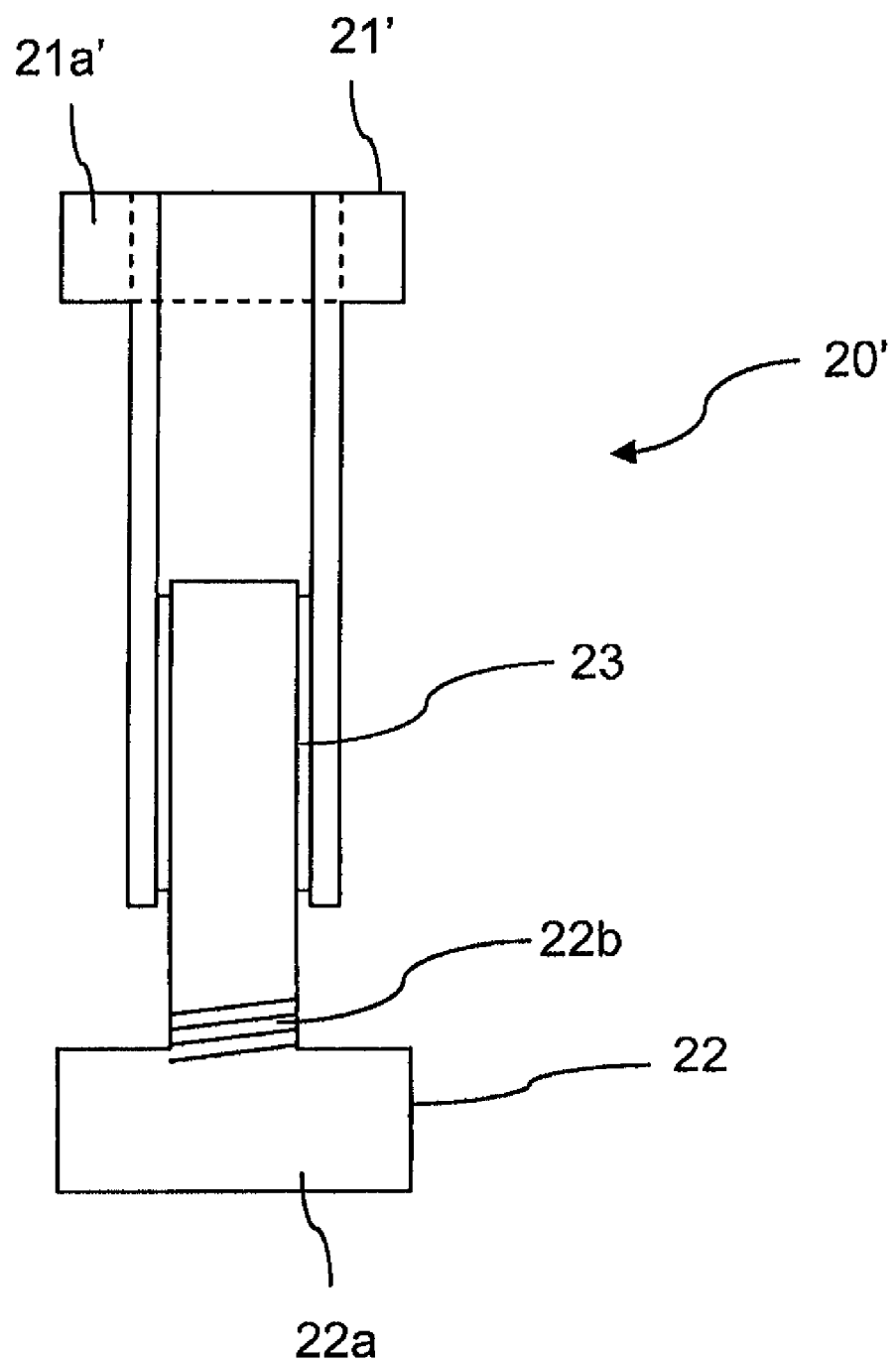
FIG. 7 is a simplified vertical cross sectional view of a first alternative configuration of a tie rod of the fuel cell stack structure illustrated in FIG. 5 in accordance with the second embodiment of the present invention.

Similarly to the first embodiment, the cross sectional shape of the tie rod 20 is preferably circular. The communication hole 21c provided in the outer cylinder 21 serves to prevent moisture from accumulating inside the outer cylinder 21 (which could cause corrosion of the electrolyte) due to poor ventilation between a space S inside the outer cylinder 21 and the outside. Instead of providing the communication hole 21c in the side of the outer cylinder 21 as shown in FIG. 5, it is also acceptable to arrange the communication hole 21c on the center axis of the outer cylinder 21. Moreover, it is also acceptable to provide a tie rod 20′ in which a head 21a′ of an outer cylinder 21′ is arranged such that it is open to the outside air as shown in FIG. 7. In this case, the process of forming the communication hole 21c can be eliminated, and thus, the manufacturing cost can be reduced by using a pipe for an outer cylinder 21′.

Figure 8A:
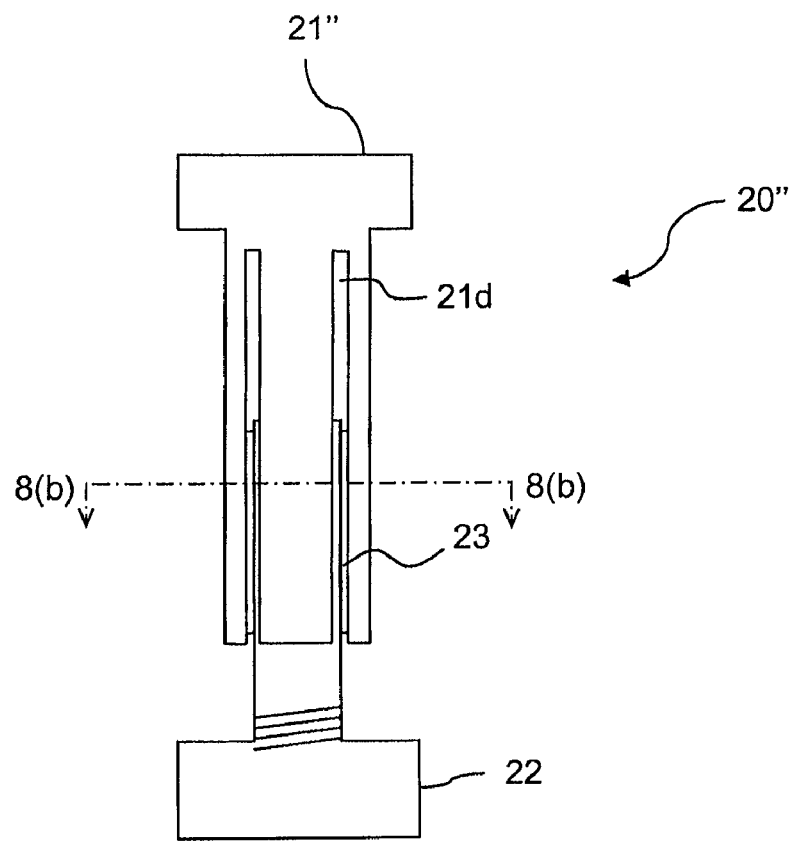
FIG. 8(a) is a simplified side elevational view of a second alternative configuration of the tie rod of the fuel cell stack structure illustrated in FIG. 5 in accordance with the second embodiment of the present invention.
Figure 8B:
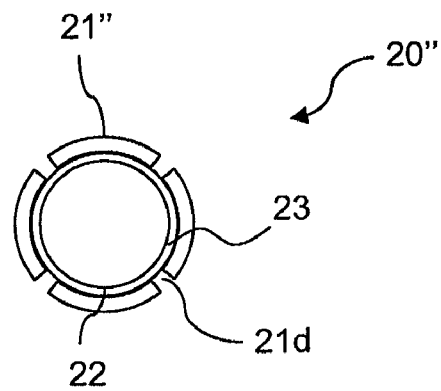
FIG. 8(b) is a simplified cross sectional view of the second alternative configuration of the tie rod taken along a section line 8(*b*)-8(*b*) of FIG. 8(*a*) in accordance with the second embodiment of the present invention.

It is also acceptable for an outer cylinder 21″ of a tie rod 20″ to be split in the lengthwise direction with a plurality of slits 21d as shown in FIGS. 8(a) and 8(b). If the slits 21d are longer than the portion where the outer cylinder 21″ and the inner shaft 22 overlap, then it is not necessary to form the communication hole 21c because the slits 21d serve as the vent holes.

In any one of the structures of the tie rods 20, 20′ and 20″ disclosed above, the volume of the metallic glass 23 shrinks during crystallization when the outer cylinder 21 (or the outer cylinder 21′ or 21″) and the inner shaft 22 are joined together. If the slits 21d are provided as in the outer cylinder 21″, the joined portion of the outer cylinder 21″ can flex toward a smaller diameter in accordance with the shrinking of the metallic glass 23. Therefore, the metallic glass 23 is prevented from peeling away from one of the joined surfaces.

The sealing material 3 can be the same material as the metallic glass 23 of the tie rod 20, a material equal or lower glass transition temperatures and crystallization temperatures than the metallic glass 23, a glass having such a melting point that the glass softens slightly at the operating temperature, a ceramic glass or crystallized glass that crystallizes at a temperature equal to or below the joining temperature (crystallization temperature of the metallic glass 23) of the tie rod 20, or a ceramic-based adhesive. Depending on the operating temperature of the fuel cell stack structure 1", it may even be acceptable to use a resin-based adhesive.

In particular, when the sealing material 3 is a metal glass that exhibits glass transition and crystallization at temperatures equal to or below the glass transition temperature and crystallization temperature of the metallic glass 23 used in the tie rod 20, the sealing material 3 adheres and crystallizes before becoming fixed by the tie rod 20 during the temperature raising step. Unlike the previously described glass sealing material, a metallic glass sealing material can be used in a completely solid state at the operating temperature and provides extra resistance to internal/external pressure differences. Additionally, a metal glass sealing material does not require any special (additional) processing operations because it joins during the temperature raising step.

Instead of using the metallic glass 23 used to join the tie rod 20, it is also acceptable to use a glass material, a crystallized glass, or a metal brazing filler material as the fixing member in the second embodiment. It is also acceptable to use a joining method that involves forming a metallic compound.

When a glass whose melting point after crystallization is equal to or higher than the operating temperature is used as the joining material in the gap between the outer cylinder 21 and the inner shaft 22 of the tie rod 20, the joining can be accomplished by heating to a high temperature under normal atmospheric conditions because the joining material is an oxide glass substance. Consequently, the control of the processing atmosphere is simple and the joining material is resistant to corrosion. Additionally, using a glass joining material makes it easier to insulate the ends of the tie rod 20 from each other because a separate insulating plate is not necessary.

When a ceramic glass material whose melting point after crystallization is equal to or higher than the operating temperature is used as the joining material in the gap between the outer cylinder 21 and the inner shaft 22 of the tie rod 20, the joining can be accomplished by heating and crystallizing the joining material under normal atmospheric conditions. Additionally, since a ceramic glass material can be crystallized and joined at a lower temperature than a glass material, the process can be executed at a lower temperature and thermal deformation and degradation of surrounding parts can be suppressed.

If a brazing filler material whose melting temperature is sufficiently high with respect to the operating temperature is used as the joining material in the gap between the outer cylinder 21 and the inner shaft 22 of the tie rod 20, then, similarly to when a metallic glass joining material is used, the tie rod 20 can be joined by electrically heating the tie rod 20 to a high temperature after the furnace temperature has been raised. Consequently, a metal brazing filler material is easy to use from a manufacturing standpoint and can be substituted readily for a metallic glass material as the joining material without making any significant changes to the manufacturing process.

The outer cylinder 21 and the inner cylinder 22 of the tie rod 20 can also be joined with a metallic compound that exhibits high strength at temperatures higher than a normal temperature. The gap between the outer cylinder 21 and the inner cylinder 22 can be filled with such a metallic compound, e.g., $Ni_3Al$, by first applying a film of one metal (e.g., Ni) on one of the opposing surfaces and a film of the other metal (e.g., Al) on the other of the opposing surfaces (i.e., the inner circumferential surface of the outer cylinder 21 and the outer circumferential surface of the inner shaft 22 to be joined). Then, the tie rod 20 is heated electrically while compressing the metals between the surfaces to be joined, thus forming a metallic compound. With this method, a joining material having a high strength at high temperatures can be synthesized on the spot during the joining process.

Figure 9:
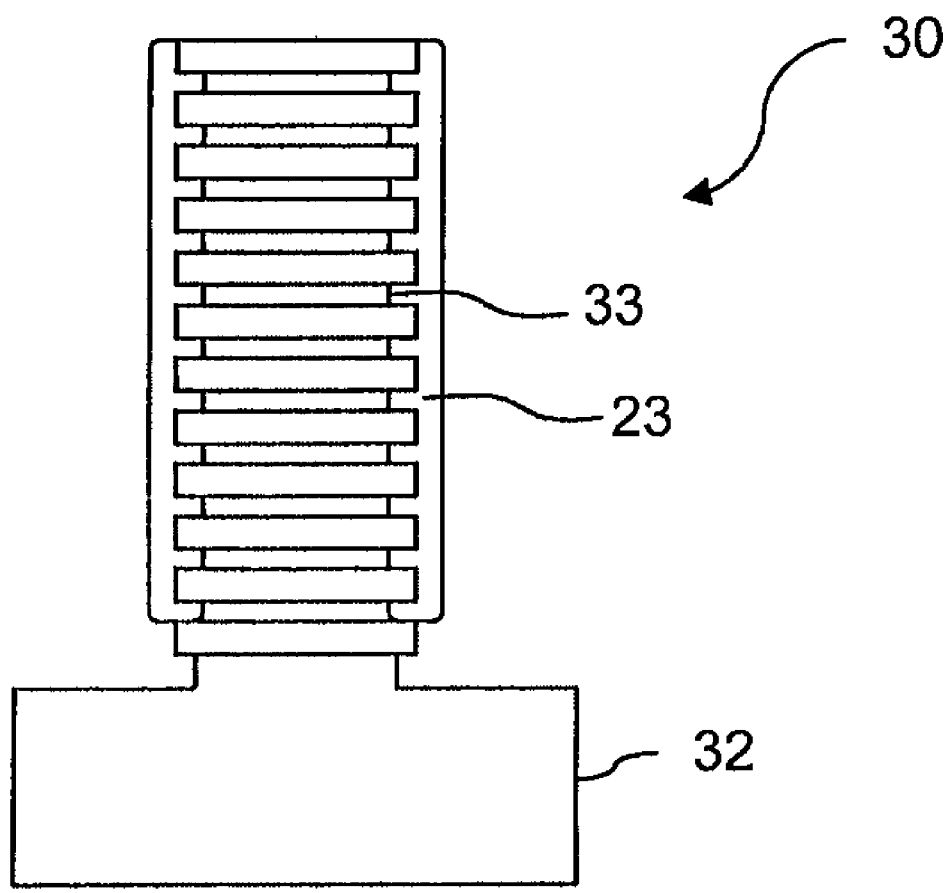
FIG. 9 is a simplified cross sectional view of an inner shaft of a third alternative configuration of the tie rod of the fuel cell stack structure in accordance with the second embodiment of the present invention.

Alternatively, the tie rod 20 of the second embodiment can be modified as a tie rod 30 that includes an inner shaft 32 as shown in FIG. 9. FIG. 9 is a simplified partial cross sectional view of the inner shaft 32 of the tie rod 30 in accordance with a modified structure of the second embodiment in which the metallic glass 23 is used as the joining material. As shown in FIG. 9, the inner shaft 32 includes a plurality of annular grooves 33. The annular grooves 33 run uninterruptedly in the circumferential direction on an outer circumferential surface thereof. When an outer cylinder is moved while the metallic glass 23 is in a glass transition state, the surface oxide film of the metallic glass 23 is broken by the corner portions of the grooves 33 and the fresh surfaces of metallic glass 23 are exposed. Therefore, the joining together of the surfaces of the inner shaft 32 and the outer cylinder can be accelerated. Additionally, the metallic glass 23 latches onto the side surfaces of the grooves 33, thereby further strengthening the connection. Although the example in which the annular grooves 33 are formed on the inner shaft 32 is explained in FIG. 9, it will be apparent to those skilled in the art from this disclosure that the annular grooves can be formed on the outer cylinder of the tie rod 30.

Figure 10:
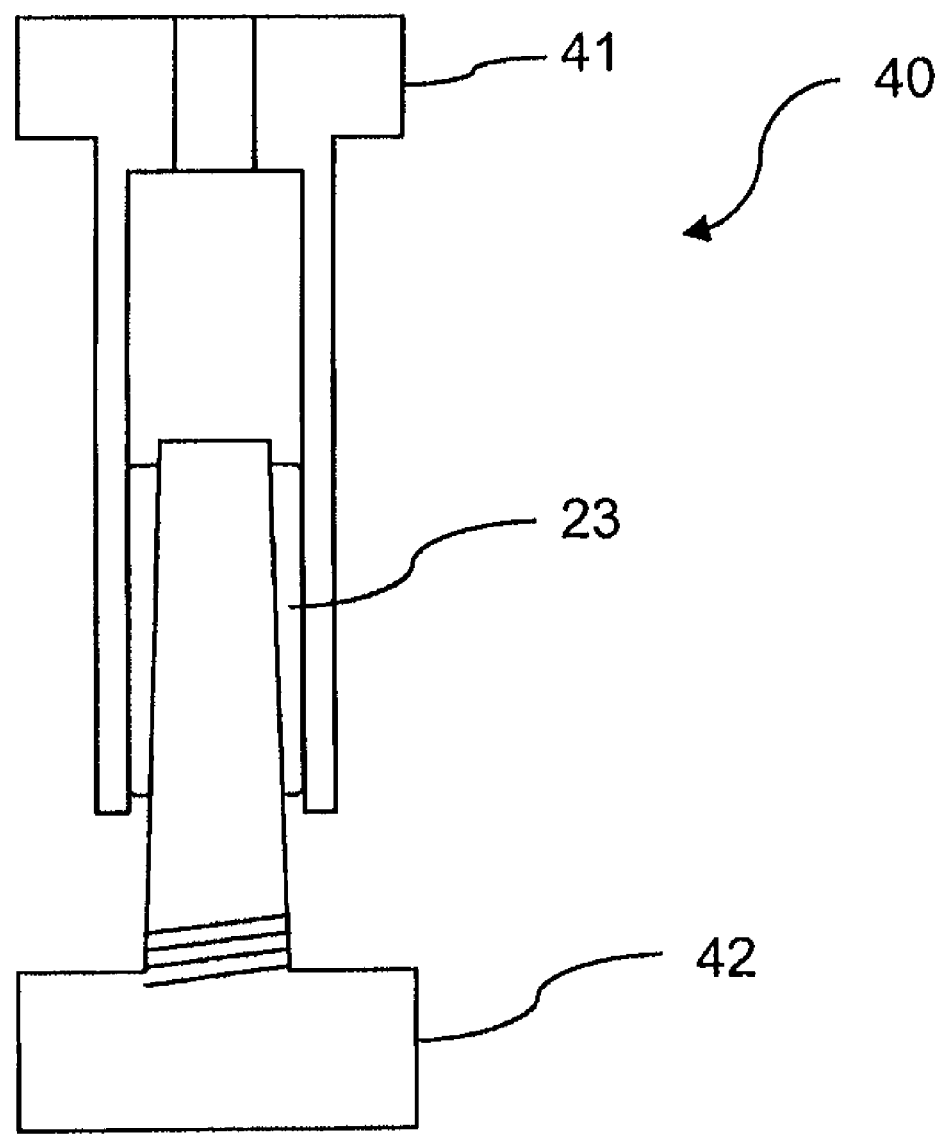
FIG. 10 is a simplified vertical cross sectional view of an alternative configuration of the tie rod of the fuel cell stack structure illustrated in FIG. 9 in accordance with the second embodiment of the present invention.

Instead of forming the grooves 33 in the inner shaft 32, it is also acceptable to configure an inner shaft 42 of a tie rod 40 to be tapered such that it becomes narrower toward the tip end thereof as shown in FIG. 10. As the inner shaft 42 moves deeper into an outer cylinder 41 during the joining process, the plastic deformation of the metallic glass 23 increases and contributes to the joining. Also, the tapered shape causes a force acting in the direction of pulling the inner shaft 42 and outer cylinder 41 together (i.e., such a direction as to increase the fastening force) to develop when the metallic glass 23 contracts during crystallization.

Figure 11:
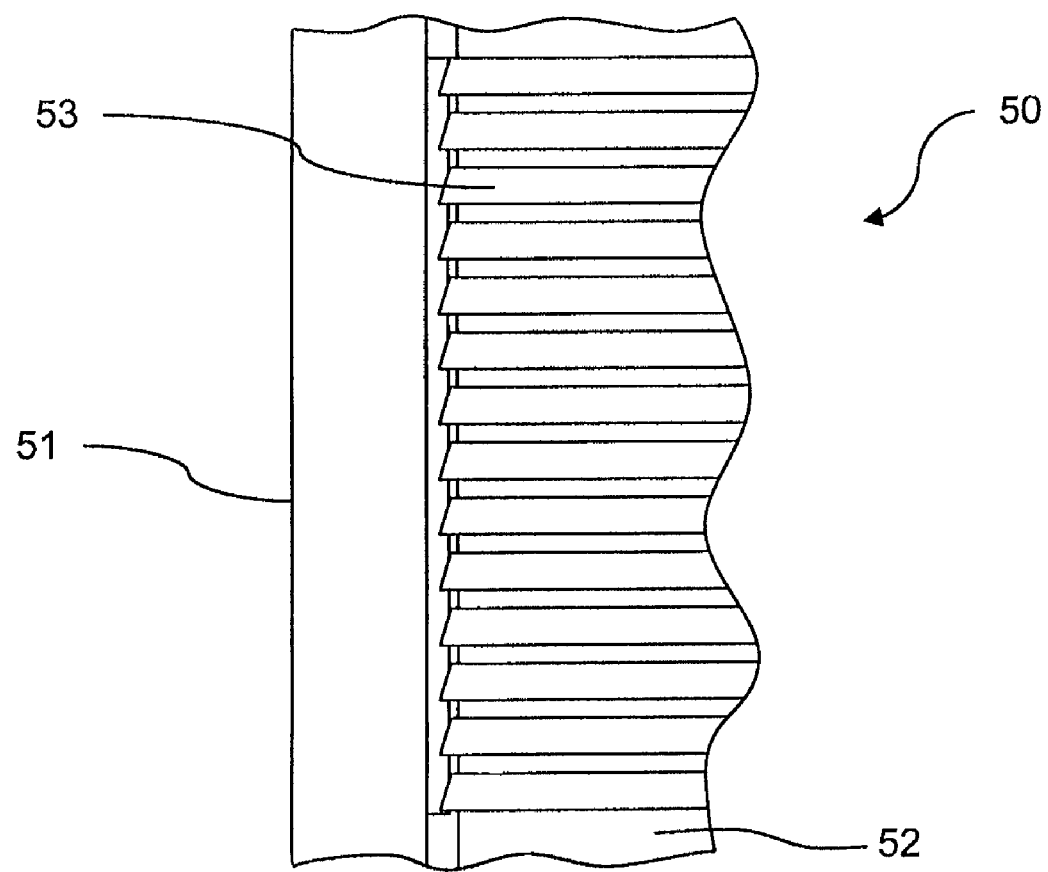
FIG. 11 is a partial vertical cross sectional view of another alternative configuration of the tie rod of the fuel cell stack structure illustrated in FIG. 9 in accordance with the second embodiment of the present invention.

FIG. 11 shows an example in which both grooves and a tapered shape are employed on the outer circumferential surface of an inner shaft 52 of a tie rod 50. As shown in FIG. 11, the inner shaft 52 has a plurality of annular protrusions 53. The peak portions of the annular protrusions 53 are tapered so as to narrow toward the tip end of the inner shaft 52. With this configuration, the effects of both grooves and a tapered shape can be enjoyed simultaneously.

Accordingly, the fuel cell stack structure 1" in accordance with the second embodiment can be configured and arranged to have at least one vent hole 21c provided in either the outer cylinder 21 or the inner shaft 22 of the tie rod 20. The vent hold 21c is configured and arranged to communicate between the space S formed inside the outer cylinder 21 when the inner shaft 22 is fitted therein and a space surrounding the outside of the outer cylinder 21. When this configuration is adopted, moisture can be prevented from collecting in the space S and causing corrosion to progress.

The fuel cell stack structure 1" in accordance with the second embodiment can be configured and arranged to have the externally threaded section 22b formed on a base end portion of either the outer cylinder 21 or the inner shaft 22 of the tie rod 20 and the internally threaded section 6b configured to mesh with the externally threaded section 22b is provided in the end plate 6 (or 5). Thus, when the configuration is adopted, either the outer cylinder 21 or the inner shaft 22 of the tie rod 20 can be fastened to the end plate 5 or 6 before the outer cylinder 21 and the inner shaft 22 are fastened together. As a result, the task of setting jigs and the task of positioning the solid electrolyte fuel cell units 2 can be accomplished more readily. Additionally, when the sealing material 9 is filled in between the end plate 5 or 6 and the tie rod 20, the sealing operation is improved because the tie rod 20 and the end plate 5 or 6 can be put into intimate contact by being screwed together.

The fuel cell stack structure 20 in accordance with the second embodiment can be configured and arranged such that the fixing member of the tie rod 20 is a joining material (e.g., the metallic glass 23) that is filled in between the outer cylinder 21 and the inner shaft 22. The joining material is configured and arranged to maintain its cured state at an operating temperature of the fuel cell stack structure 20. When this configuration is adopted, the outer cylinder 21 and the inner shaft 22 of the tie rod 20 can be fixed together at any desired lengthwise position and a high strength can be obtained after the fixing process because the resulting pressurizing force is born by a surface.

The fuel cell stack structure in accordance with the present invention can be configured and arranged to have an intermittent or continuous groove 33 that is provided on one or both of the opposing surfaces of the outer cylinder and the inner shaft 32 of the tie rod 30 and runs around the center axis of the tie rod 30. When this configuration is adopted, the joining material enters into the groove 33 and the groove 33 serves as a place for the joining material to catch onto. As a result, the bonding strength is improved.

The fuel cell stack structure 1" in accordance with the second embodiment can be configured and arranged to have the sealing material 3 filled in between the solid electrolytic fuel cell units 2 of the stack entity 4. The sealing material 3 is configured and arranged to exhibit a gas sealing characteristic at a temperature equal to or below a joining temperature of the joining material (e.g., the metallic glass 23) used as the fixing member. When this configuration is adopted, the outer cylinder 21 and the inner shaft 22 of the tie rod 20 are prevented from being fixed together in the lengthwise direction before the height of the sealing material 3 between the solid electrolyte fuel cell units 2 is determined. In other words, the sealed state accomplished by the sealing material 3 disposed between the solid electrolyte fuel cell units 2 is completed before the outer cylinder 21 and the inner shaft 22 of the tie rod 20 become fixed together.

The examples of candidates for the sealing material are glass with the degree of softening controlled, glass ceramic whose crystallization temperature is equal to or below the fixing temperature of the tie rod (e.g., a temperature at which the joining material is cured or hardened), metallic glass that exhibits glass transition and crystallization at a lower temperature than the joining material of the tie rod, and ceramic-based adhesive.

The fuel cell stack structure 1" in accordance with the second embodiment can be configured and arranged such that the joining material (e.g., the metallic glass 23) is arranged on both opposing surfaces of the outer cylinder 21 and the inner shaft 22 of the tie rod 20 at least in the region where the outer cylinder 21 and the inner shaft 22 overlap. The joining material is configured and arranged to enable sliding movement at temperatures below a joining temperature. When this configuration is adopted, the outer cylinder 21 and the inner shaft 22 can be bonded together without moving the outer cylinder 21 and the inner shaft 22 through long distances. Also, after the outer cylinder 21 and the inner shaft 22 have been fixed together, the surface area over which the joining material is arranged is expanded and the thickness of the joining material does not decrease. As a result, a sufficient amount of joining material can be filled along the lengthwise direction of the tie rod 20 and a high bond strength can be obtained.

The fuel cell stack structure 1" in accordance with the second embodiment can be configured and arranged such that the metallic glass 23 is used for the joining material serving as the fixing member and the outer cylinder 21 and the inner shaft 22 of the tie rod 20 are fixed together in the lengthwise direction by crystallizing the metallic glass 23.

Many metallic glasses soften at temperatures lower than the melting points of existing brazing filler materials and also crystallize and solidify at low temperatures. Consequently, when the stack entity 4 is fastened and fixed together and the tie rod 20 in accordance with the second embodiment is installed by applying pressure while heating to the glass transition temperature, the metallic glass 23 flows, exposes a fresh surface, and bonds to the material of the tie rod 20. Thus, if the metallic glass 23 is then crystallized, although it will be in a super cooled liquid region and lose its uniquely high mechanical strength, it will become a normal alloy of the same composition and tie rod 20 will be fixed in a strong and stable manner.

When the configuration just described is adopted, the fuel cell stack structure 1" having a high output density can be assembled in a compact manner with a simple process involving merely heating and applying pressure. Any number of solid electrolytic fuel cell units 2 can be stacked by matching the length of the tie rod 20 to the height of the stack entity 4, and the task of joining the outer cylinder 21 and the inner shaft 22 of the tie rod 20 can be accomplished by merely controlling the applied pressure to the pressure required by the sealing material 3 between the solid electrolytic fuel cell units 2. As a result, it is possible to achieve the same quality of bond every time the fuel cell stack structure 1" is assembled.

The fuel cell stack structure 1" in accordance with the second embodiment can be configured and arranged such that a glass having a melting point equal to or larger than an operating temperature after crystallization is used for the joining material serving as the fixing member. When this configuration is adopted, the outer cylinder 21 and the inner shaft 22 of the tie rod 20 can be bonded together by heating to a high temperature under normal atmospheric conditions. Additionally, the bond is resistant to corrosion and serves as a simple way to insulate the ends of the tie rod from each other.

The fuel cell stack structure 1" in accordance with the second embodiment can be configured and arranged such that a glass ceramic having a melting point equal to or larger than an operating temperature after crystallization is used for the joining material serving as the fixing member. When this configuration is adopted, it is possible to select a joining material that can be bonded at a lower temperature than a glass whose melting point after crystallization is equal to or larger than the operating temperature. Thus, the process can be constructed to be executed at a lower temperature than when using a glass whose melting point after crystallization is equal to or larger than the operating temperature, making it possible to suppress thermal deformation and degradation of surrounding parts.

The fuel cell stack structure 1" in accordance with the second embodiment can be configured and arranged such that a brazing filler material having a melting temperature sufficiently high with respect to an operating temperature is used for the joining material serving as the fixing member. When this configuration is adopted, the tie rod 20 can be heated by electrifying (passing a current through) the tie rod 20. Thus, the temperature of the tie rod 20 alone can be raised after the solid electrolytic fuel cell units 2 of the stack entity 4 have been sealed. As a result, thermal deformation and degradation of other members can be suppressed even further and the process can be simplified.

The fuel cell stack structure 1" in accordance with the second embodiment can be configured and arranged to use a metallic compound as the joining material serving as the fixing member. For example, a nickel (Ni) film and an aluminum (Al) film can be formed on the outer cylinder 21 and the inner shaft 22, respectively, of the tie rod 20 and the outer cylinder 21 and the inner shaft 22 can be bonded together by heating the tie rod 20 with the films in close contact with each other such that the metallic compound Ni3Al is formed. Ni3Al has a high strength at high temperatures. With this configuration of the invention, the tie rod 20 can be heated electrically and a high-strength bond can be achieved with a simple process.

The tie rod 40 of the fuel cell stack structure in accordance with the second embodiment can be configured and arranged such that the portion of the inner shaft 42 of the tie rod 40 that fits into the outer cylinder 41 has a tapered shape. When this configuration is adopted, the gap between the outer cylinder 41 and the inner shaft 42 of the tie rod 40 becomes gradually smaller as the inner shaft 42 is pushed into the outer cylinder 41. As a result, the adhesion of the joining material can be improved when a joining material is employed. More specifically, when the fixing member is the joining material (e.g., the metallic glass 23), the joining material is rubbed onto the surfaces to be joined as the inner shaft 42 is inserted into the outer cylinder 41 and, thus, wetting at the boundary surfaces is promoted. After the inner shaft 42 has been positioned in the outer cylinder 41, the contraction that occurs during crystallization causes tension to develop between the outer cylinder 41 and the inner shaft 42 of the tie rod 40, thus increasing the fastening force fixing the outer cylinder 41 and the inner shaft 42 together.

The tie rod 50 of the fuel cell stack structure in accordance with the second embodiment can be configured such that the inner shaft 52 of the tie rod 50 has a plurality of tapered annular protruding parts 53 on the portion of the inner shaft 52 of the tie rod 50 that fits into the outer cylinder 51. When this configuration is adopted, even though the annular protruding parts 53 are provided, the amount of joining material filled in-between the outer cylinder 51 and the inner shaft 52 of the tie rod 50 in order to enable the portion where the gap between the outer cylinder 51 and the inner shaft 52 widens to contribute to the joint can be reduced. As a result, the amount of plastic deformation occurring during joining can be reduced and the workability is improved.

The tie rod 20' of the fuel cell stack structure in accordance with the second embodiment can be configured and arranged such that the base end portion of the outer cylinder 21' of the tie rod 20', i.e., the end of the outer cylinder 21' opposite the end where the outer cylinder 21' and the inner shaft 22 fit together, is open to the space surrounding the outside of the outer cylinder 21'. When this configuration is adopted, a pipe can be used as the outer cylinder 21' and the cost of manufacturing the outer cylinder 21' can be greatly reduced in comparison with an outer cylinder that must be machined out.

The tie rod 20" of the fuel cell stack structure in accordance with the second embodiment is configured and arranged such that at least one lengthwise slit 21d is provided in the outer cylinder 21" of the tie rod 20" in the region where the outer cylinder 21" and the inner shaft 22 fit together. When this configuration is adopted, a certain degree of freedom is obtained regarding the diameter of the outer cylinder 21" of the tie rod 20". More specifically, during the contraction that takes place after the outer cylinder 21" and the inner shaft 22 of the tie rod 20" are fixed together with the joining material, the outer cylinder 21 is drawn in such that the manner in which the joining material fills the gap in-between the opposing surfaces of the bonded portion is improved. As a result, the strength of the bond is increased. Additionally, the slits 21d function advantageously to open the space formed inside the outer cylinder 21" by the fitting together of the outer cylinder 21" and the inner shaft 22 to the space surrounding the outside of the outer cylinder 21".

The fuel cell stack structure 1" in accordance with the second embodiment can be configured such that the joining material is raised to the glass transition temperature and then the crystallization is completed so as to fix the outer cylinder 21 and the inner shaft 22 of the tie rod together in the lengthwise direction. Crystallizing the metallic glass after joining causes the metallic glass to remain solid up to the normal melting point of the metal alloy and eliminates the exhibition of super cooled liquid behavior. As a result, the tie rod 20 can maintain a stable state even if the pressurizing force is removed. In short, the crystallization can be accomplished with a simple operation executed after the temperature is raised in order to join the outer cylinder 21 and the inner shaft 22 together, and it is not necessary to cool the tie rod 20 while maintaining the pressurized state. Thus, the crystallization and cooling operations can be simplified.

The fuel cell stack structure 1" in accordance with the present invention can be configured such that the joining material is raised to a glass transition temperature and then held in a temperature region in which a glass transition state is exhibited until the crystallization is completed so as to fix the outer cylinder 21 and the inner shaft 22 of the tie rod 20 together in the lengthwise direction. With this configuration, it is not necessary to raise the temperature after joining the outer cylinder 21 and the inner shaft 22 together and the crystallization can be accomplished by maintaining the applied pressure and allowing the tie rod 20 to sit for a prescribed amount of time determined based on the temperature. The temperature to which the joining material is raised and the time required for crystallization exhibit an inversely proportional trend. Thus, thermal stress and deformation can be suppressed by using a lower temperature. As a result, a joint having a high dimensional precision can be obtained and deformation and degradation can be reduced.

The fuel cell stack structure 1" in accordance with the second embodiment can be configured such that the joining material is raised to the glass transition temperature and then raised further to the crystallization temperature to complete the crystallization so as to fix the outer cylinder 21 and the inner shaft 22 of the tie rod 20 together in the lengthwise direction. With this configuration, the joining material crystallizes immediately because it is raised to the crystallization temperature or higher. As a result, the crystallization can be accomplished in a reliable manner without the need to manage the manufacturing time.

The fuel cell stack structure manufacturing method in accordance with the second embodiment includes the steps of forming the stack entity 4 by stacking the solid electrolyte fuel cell units 2 together in a stacking direction, inserting the tip end portion of the outer cylinder 21 of the tie rod 20 into the stack entity 4 from a first end of the stack entity 4 and inserting the tip end portion of the inner shaft 22 of the tie rod 20 into the stack entity 4 from a second end of the stack entity 4, fitting the outer cylinder 21 and the inner shaft 22 of the tie rod 20 together such that the joining material is arranged between the opposing surfaces of the outer cylinder 21 and the inner shaft 22, and heating the joining material filled in between the outer cylinder 21 and the inner shaft 22 of the tie rod 20 while applying axial compressive pressure to the tie rod 20.

The fuel cell stack structure manufacturing method in accordance with the second embodiment includes the steps of forming the stack entity 4 by stacking the solid electrolyte fuel cell units 2 together in a stacking direction, inserting the tip end portion of the outer cylinder 21 of the tie rod 20 into the stack entity 4 from a first end of the stack entity 4 and inserting the tip end portion of the inner shaft 22 of the tie rod 20 into the stack entity 4 from a second end of the stack entity 4, fitting the outer cylinder 21 and the inner shaft 22 of the tie rod 20 together such that the metallic glass 23 as the joining material is arranged between the opposing surfaces of the outer cylinder 21 and the inner shaft 22, and heating and crystallizing the metallic glass 23 filled in between the outer cylinder 21 and the inner shaft 22 of the tie rod 20 while applying axial compressive pressure to the tie rod 20. In either of these manufacturing methods, the joining material can be heated by electrifying the tie rod 20 such that the tie rod 20 itself emits heat, thereby eliminating the need to heat the entire stack entity 4. By adopting such a configuration, degradation of the members can be prevented, the processing time can be shortened, and the manufacturing cost can be reduced in accordance with the reduction in the processing time.

Third Embodiment

Figure 12:
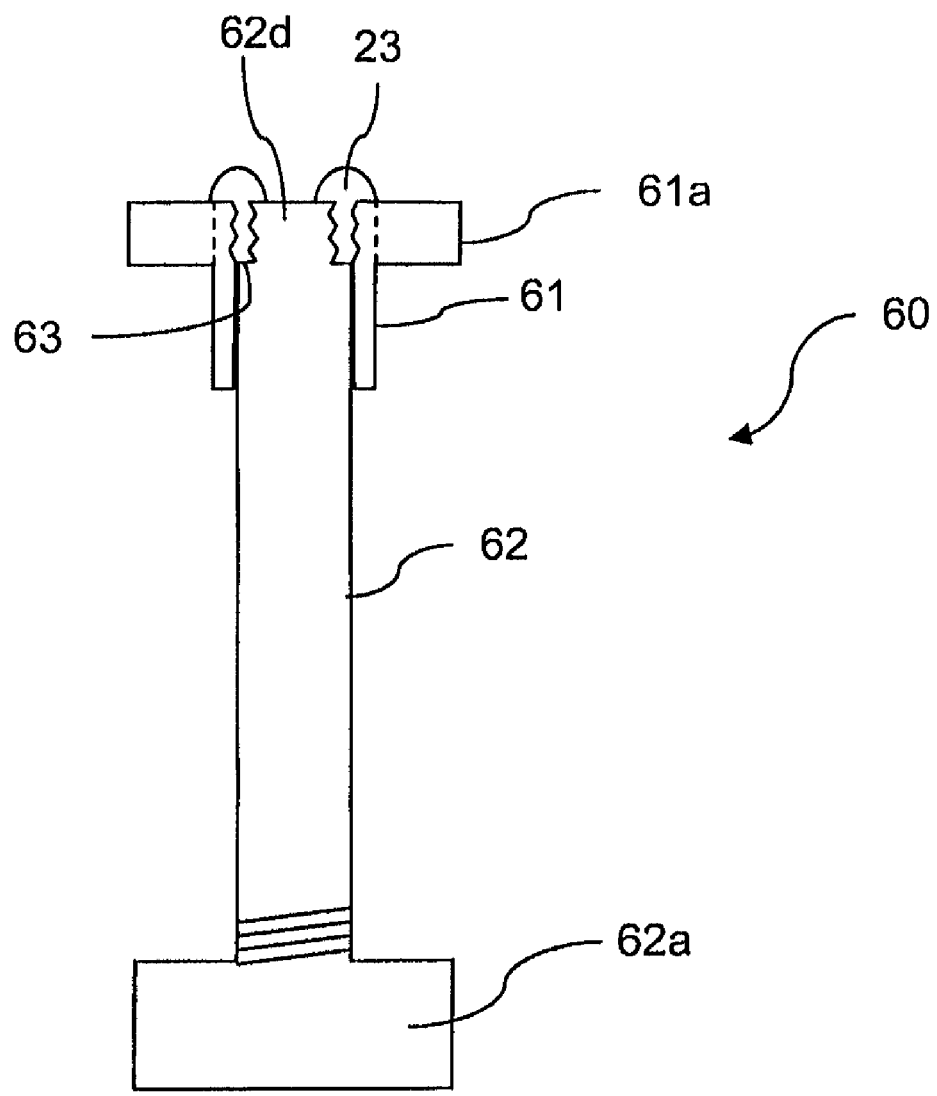
FIG. 12 is a simplified vertical cross sectional view of a tie rod of a fuel cell stack structure in accordance with a third embodiment of the present invention.
Figure 13:
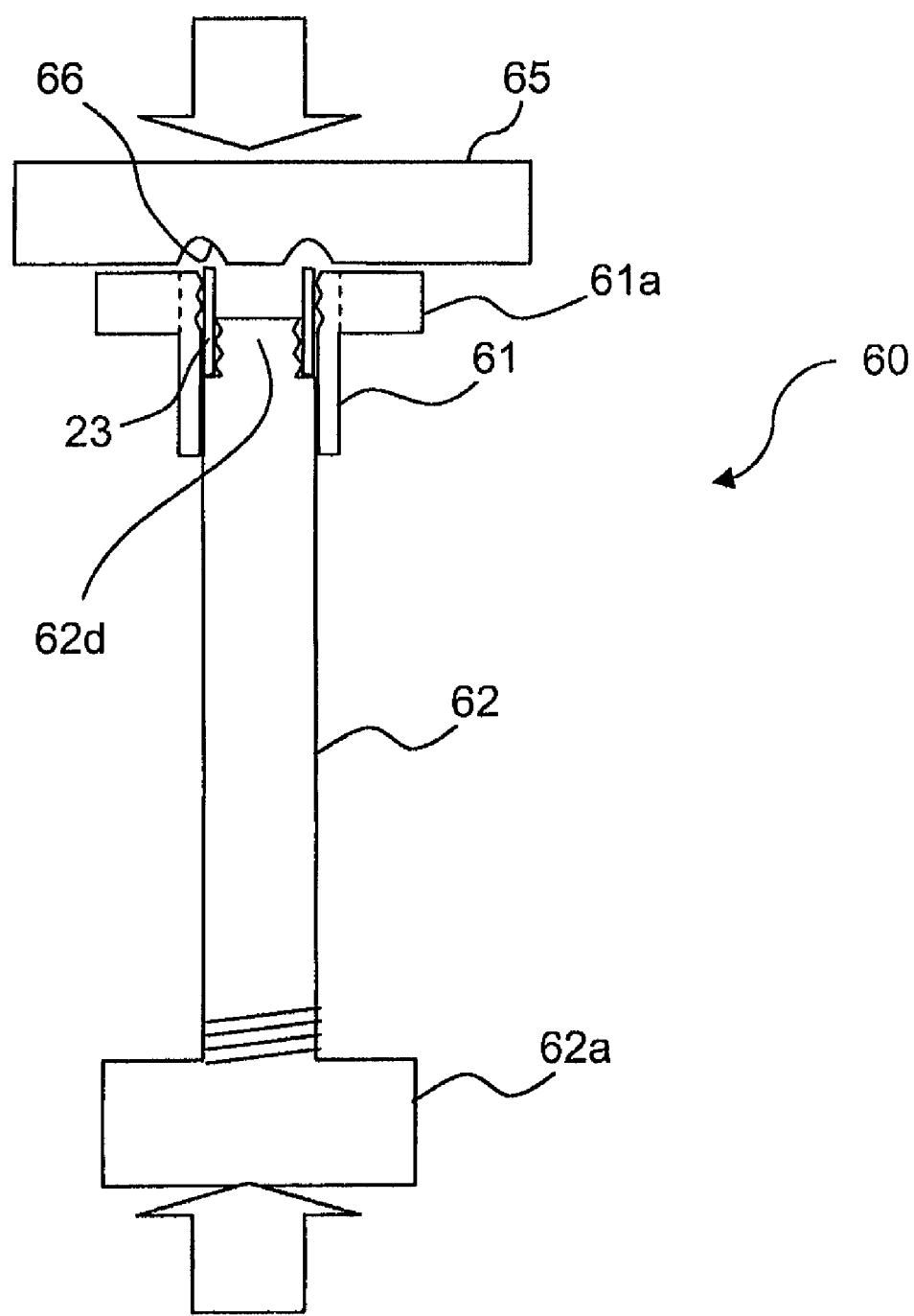
FIG. 13 is a simplified vertical cross sectional view illustrating the tie rod as shown in FIG. 12 being pressed during fabrication of the fuel cell stack structure in accordance with the third embodiment of the present invention.

Referring now to FIGS. 12 and 13, a fuel cell stack structure in accordance with a third embodiment will now be explained. In view of the similarity between the second and third embodiments, the parts of the third embodiment that are identical to the parts of the second embodiment will be given the same reference numerals as the parts of the second embodiment. Moreover, the descriptions of the parts of the third embodiment that are identical to the parts of the second embodiment may be omitted for the sake of brevity.

The fuel cell stack structure of the third embodiment is basically identical to the fuel cell stack structure 1" of the second embodiment illustrated in FIG. 5 except that a tie rod 60 is used in the third embodiment instead of the tie rod 20. Thus, only the structures of the tie rod 60 will be explained in detail below.

FIG. 12 is a simplified vertical cross sectional view of the tie rod 60 in accordance with the third embodiment of the present invention. As shown in FIG. 12, in the third embodiment, a tip end portion 62*d* of an inner shaft 62 of the tie rod 60 (i.e., the end portion inserted into the outer cylinder 61) is exposed at a base end portion 61*a* of an outer cylinder 61 (i.e., the end portion of the outer cylinder 61 opposite the end where the inner shaft 62 is inserted into the outer cylinder 61). The fixing member in the third embodiment includes the metallic glass material 23 that is arranged between the tip end portion 62*d* of the inner shaft 62 and the base end portion 61*a* of the outer cylinder 61. The metallic glass material 23 is configured and arranged to fix the outer cylinder 61 and the inner shaft 62 of the tie rod 60 together in the lengthwise direction by undergoing plastic deformation.

More specifically, the area between the base end portion 61*a* of the outer cylinder 61 of the tie rod 60 and the tip end portion 62*d* of the inner shaft 62 has a plurality of grooves 63. The metallic glass 23 is filled into the grooves 63 and plastically deformed into a rivet-like shape, thus fastening the outer cylinder 61 and the inner shaft 62 of the tie rod 60 together in the lengthwise direction.

With this method, the joint between the outer cylinder 61 and the inner shaft 62 is accomplished mainly by a mechanical engagement. FIG. 13 illustrates how the joint is made using a pressing tool 65. The pressing tool 65 is preferably made of a material (e.g., graphite) that is not wettable with the metallic glass 23 and is provided with a rivet-shaped recess 66. The metallic glass 23 is formed into a rivet-like shape by being deformed in a pressurized glass transition state. Afterwards, the metallic glass 23 is crystallized using one of the methods described previously.

In the third embodiment, the shaft diameter of the inner shaft 62 of the tie rod 60 is 8 mm and the length excluding the head 62*a* is 22.4 cm. The tip end portion 62*d* is 6 mm long and 7 mm in diameter and has the annular grooves 63 of a depth 1 mm formed therein at a pitch of 2 mm. The total length of the outer cylinder 61 of the tie rod 60 is 5 cm and the internal diameter is 8 mm. Annular grooves 63 of depth 1 mm are formed in the internal surface of the larger-diameter base end portion 61*a* of the outer cylinder 61 at a pitch of 2 mm and a length of 6 mm.

A metallic glass material (the metallic glass 23) having the same composition as mentioned previously is provided in a thin sheet-like form of width 15 mm and thickness 50 µm. The metallic glass material is wrapped onto the tip end portion 62*d* of the inner shaft 62 in a tube-like shape so as to form a metallic glass material 23 having an internal diameter 7 mm and an external diameter of 8 mm. Similarly to the second embodiment illustrated in FIG. 5, the inner shaft 62 is fixed to the end plate 6, and the solid electrolytic fuel cell units 2 and the sealing material 3 are stacked alternately until the stack entity 4 having 100 layers is achieved. Next, the upper end plate 5 of the stack entity 4 is placed on top of the stack and the insulating plate 8 and the Belleville spring 7 are placed on top of the upper end plate 5. Then, the short outer cylinder 61 is fitted onto the tip end portion 62*d* of the inner shaft 62 and pressed down while being heated in a furnace (furnace 13 in FIG. 1). The furnace is heated to the glass transition point of the metallic glass 23 and the pressing tool 65 squashes the end portion of the metallic glass 23 and forms it into a rivet-like shape, thus completing the joint between the outer cylinder 61 and the inner shaft 62.

The tie rod 60 of the fuel cell stack structure in accordance with the third embodiment can be configured and arranged such that the tip end portion 62*d* of the inner shaft 62 of the tie rod 60 (i.e., the end portion inserted into the outer cylinder 61) is exposed at the base end portion of the outer cylinder 61 (i.e., the end of the outer cylinder 61 opposite the end where the inner shaft 62 is inserted into the outer cylinder 61), and the fixing member includes the metallic glass material 23 that is arranged between the tip end portion 62*d* of the inner shaft 62 and the base end portion of the outer cylinder 61. The metallic glass material 23 is configured and arranged to fix the outer cylinder 61 and the inner shaft 62 of the tie rod 60 together in the lengthwise direction by undergoing plastic deformation.

More specifically, the metallic glass material 23 serving as the joining material is plastically deformed between the tip end portion 62*d* of the inner shaft 62 and the base end portion of the outer cylinder 61 so as to have a rivet-like shape, thereby fixing the outer cylinder 61 and the inner shaft 62 of the tie rod 60 together in the lengthwise direction. When this configuration is adopted, the joining of the outer cylinder 61 and the inner shaft 62 is accomplished solely by the deformation of the metallic glass material 23. As a result, it is not mandatory to expose a fresh surface of the metallic glass material 23 in order to accomplish the joining and the assembly work can be conducted under normal atmospheric conditions.

The fuel cell stack structure manufacturing method in accordance with the third embodiment includes the steps of forming the stack entity 4 by stacking the solid electrolyte fuel cell units 2 together in a stacking direction, inserting the tip end portion of the outer cylinder 61 of the tie rod 60 into the stack entity 4 from a first end of the stack entity 4 and inserting the tip end portion of the inner shaft 62 of the tie rod 60 into the stack entity 4 from a second end of the stack entity 4, fitting the outer cylinder 61 and the inner shaft 62 of the tie rod 60 together, exposing the tip end portion 62d of the inner shaft 62 at the base end portion of the outer cylinder 61 with the metallic glass material 23 serving as the joining material arranged between the opposing surfaces of the outer cylinder 61 and the inner shaft 62, fixing the outer cylinder 61 and the inner shaft 62 of the tie rod 60 together in the lengthwise direction by applying an axial compressive pressure to the tie rod 60 and causing the metallic glass material 23 to undergo plastic deformation.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A fuel cell stack structure comprising:
    a stack entity including a plurality of solid electrolyte fuel cell units stacked together in a stacking direction; and
    at least one tie rod extending through the stack entity to fasten the solid electrolyte fuel cell units so that the solid electrolyte fuel cell units are pressed against each other in the stacking direction, the tie rod having an outer cylinder, an inner shaft fitting into the outer cylinder, and a joining material disposed between the outer cylinder and the inner shaft, the joining material fastening the outer cylinder and the inner shaft together in an axial direction of the tie rod and being configured and arranged to maintain a cured state at an operating temperature of the fuel cell stack structure, the joining material including a metallic glass material so that the outer cylinder and the inner shaft of the tie rod are fixed together in the axial direction by crystallizing the metallic glass material.

2. The fuel cell stack structure as recited in claim 1, wherein
    the at least one tie rod includes a plurality of tie rods extending through the stack entity.

3. The fuel cell stack structure as recited in claim 1, further comprising
    a pair of end plates provided on both ends of the stack entity, the end plates having a larger mechanical strength than the solid electrolyte fuel cell units, and each of the end plates including a rod through hole with the tic rod passing therethrough, and
    a gas sealing material arranged in an airtight manner between the tie rod and the rod through holes of the end plates.

4. The fuel cell stack structure as recited in claim 3, wherein
    the outer cylinder and the inner shaft include base end portions that are opposite from tip end portions where the outer cylinder and the inner shaft fit together, each of the base end portions of the outer cylinder and the inner shaft includes a head section that has a larger diameter than an opening diameter of the rod through hole of a corresponding one of the end plates.

5. The fuel cell stack structure as recited in claim 3, wherein
    a base end portion of one of the outer cylinder and the inner shaft of the tie rod includes an externally threaded section, and one of the end plates that is coupled to the base end portion of the one of the outer cylinder and the inner shaft of the tie rod includes an internally threaded section that engages with the externally threaded section.

6. The fuel cell stack structure as recited in claim 1, wherein
    one of the outer cylinder and the inner shaft of the tie rod includes at least one vent hole that communicates between a first space formed inside the outer cylinder when the inner shaft is fitted therein and a second space surrounding outside of the outer cylinder.

7. The fuel cell stack structure as recited in claim 1, wherein
    the outer cylinder of the tie rod includes a base end portion that is opposite from an end portion where the outer cylinder and the inner shaft fit together, the base end portion of the outer cylinder is open to a space surrounding outside of the outer cylinder.

8. The fuel cell stack structure as recited in claim 1, wherein
    at least one of an inner circumferential surface of the outer cylinder and an outer circumferential surface of the inner shaft that are opposing each other includes one of an intermittent groove arranged around a center axis of the tie rod and a continuous groove arranged around the center axis of the tie rod.

9. The fuel cell stack structure as recited in claim 1, further comprising
    a sealing material disposed between the solid electrolytic fuel cell units of the stack entity, the sealing material exhibiting a gas sealing characteristic at a temperature equal to or below a joining temperature of the joining material.

10. The fuel cell stack structure as recited in claim 1, wherein
the joining material is arranged on both of an inner circumferential surface of the outer cylinder and an outer circumferential surface of the inner shaft of the tie rod at least in a region where the inner circumferential surface of the outer cylinder and the outer circumferential surface of the inner shaft overlap, the joining material is configured and arranged to allow a sliding movement between the outer cylinder and the inner shaft at a temperature below a joining temperature of the joining material.

11. The fuel cell stack structure as recited in claim 1, wherein
the joining material includes a metallic compound.

12. The fuel cell stack structure as recited in claim 1, wherein
the joining material is configured and arranged to be raised to a glass transition temperature and then to be crystallized to fasten the outer cylinder and the inner shaft of the tie rod together in the axial direction.

13. The fuel cell stack structure as recited in claim 12, wherein
the joining material is raised to the glass transition temperature and then held in a temperature region in which a glass transition state is exhibited until the joining material is crystallized to fasten the outer cylinder and the inner shaft of the tie rod together in the axial direction.

14. The fuel cell stack structure as recited in claim 12, wherein
the joining material is raised to the glass transition temperature and then raised further to a crystallization temperature to crystallize the joining material to fasten the outer cylinder and the inner shaft of the tie rod together in the axial direction.

15. A fuel cell stack structure comprising:
a stack entity including a plurality of solid electrolyte fuel cell units stacked together in a stacking direction; and
at least one tie rod extending through the stack entity to fasten the solid electrolyte fuel cell units so that the solid electrolyte fuel cell units are pressed against each other in the stacking direction, the tie rod having an outer cylinder, an inner shaft fitting into the outer cylinder, and a joining material disposed between the outer cylinder and the inner shaft, the joining material fastening the outer cylinder and the inner shaft together in an axial direction of the tie rod and being configured and arranged to maintain a cured state at an operating temperature of the fuel cell stack structure, the joining material includes including a glass material having a melting point equal to or larger than the operating temperature after crystallization.

16. The fuel cell stack structure as recited in claim 15, wherein
the glass material includes a ceramic glass material having the melting point equal to or larger than the operating temperature after crystallization.

17. A fuel cell stack structure comprising:
a stack entity including a plurality of solid electrolyte fuel cell units stacked together in a stacking direction; and
at least one tie rod extending through the stack entity to fasten the solid electrolyte fuel cell units so that the solid electrolyte fuel cell units are pressed against each other in the stacking direction, the tie rod having an outer cylinder, an inner shaft fitting into the outer cylinder, and a joining material disposed between the outer cylinder and the inner shaft, the joining material fastening the outer cylinder and the inner shaft together in an axial direction of the tie rod and being configured and arranged to maintain a cured state at an operating temperature of the fuel cell stack structure, the joining material dudes including a brazing filler material having a melting temperature higher than the operating temperature.

18. A fuel cell stack structure manufacturing method comprising:
forming a stack entity by stacking a plurality of solid electrolyte fuel cell units in a stacking direction;
inserting a tie rod into the stack entity to fasten the solid electrolyte fuel cell units so that the solid electrolyte fuel cell units are pressed against each other in the stacking direction, the tie rod having an outer cylinder and an inner shaft fitting into the outer cylinder;
fitting the outer cylinder and the inner shaft of the tie rod together in an axial direction of the tie rod with a joining material disposed between the outer cylinder and the inner shaft, the joining material being configured and arranged to maintain a cured state at an operating temperature of the fuel cell stack structure;
heating the joining material to a glass transition temperature while applying an axial compressive pressure to the tie rod; and
crystallizing the joining material to fasten the outer cylinder and the inner shaft of the tie rod together in the axial direction, the joining material including a metallic glass material.

* * * * *